United States Patent
Cheng

(10) Patent No.: US 6,501,475 B1
(45) Date of Patent: *Dec. 31, 2002

(54) GLYPH-BASED OUTLINE FONT GENERATION INDEPENDENT OF RESOLUTION

(75) Inventor: Kuo-Young Cheng, Taichung Hsien (TW)

(73) Assignee: DynaLab Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/425,449

(22) Filed: Oct. 22, 1999

(51) Int. Cl.[7] .............................................. G06T 11/00
(52) U.S. Cl. ...................... 345/467; 345/470; 345/471; 382/301
(58) Field of Search ................................ 345/467, 468, 345/469, 470–471, 472; 382/301

(56) References Cited

U.S. PATENT DOCUMENTS

| | | | |
|---|---|---|---|
| 4,897,638 A | 1/1990 | Kokunishi et al. | |
| 4,990,903 A | 2/1991 | Cheng et al. | |
| 5,119,296 A | 6/1992 | Zheng et al. | |
| 5,212,769 A | 5/1993 | Pong | |
| 5,301,267 A | * 4/1994 | Hassett et al. | 345/469 |
| 5,450,096 A | 9/1995 | Yoshida et al. | |
| 5,579,416 A | 11/1996 | Shibuya et al. | |
| 5,586,241 A | * 12/1996 | Bauermeister et al. | 345/467 |
| 5,594,855 A | 1/1997 | Von Her, II et al. | |
| 5,727,140 A | 3/1998 | Ohtomo et al. | |
| 5,734,748 A | 3/1998 | Amano | |
| 5,926,189 A | * 7/1999 | Beamen et al. | 345/467 |
| 6,151,032 A | * 11/2000 | Cheng | 345/467 |
| 6,232,987 B1 | * 5/2001 | Choi et al. | 345/467 |

* cited by examiner

Primary Examiner—Jeffery Brier
Assistant Examiner—Anthony Blackman
(74) Attorney, Agent, or Firm—Christensen O'Connor Johnson Kindness PLLC

(57) ABSTRACT

A system, method, and computer-readable medium for generating a glyph-based outline font are provided, which allow for font communication between different devices having various (high and low) resolutions. A method selects a character for display on the output device. The character consists of one or more glyphs, and each glyph forming the character is predefined by key points, width values, feature points that have predefined spatial relationship to the key points and width values, and curve ratios prestored in a curve level table. Next, the method determines the resolution of an output device. Then, for each glyph forming the character, the method retrieves curve ratios from the prestored curve level table according to the determined resolution of the output device. Curve ratios are used to create curve segments, which form the outline of the selected glyph. Finally, the method renders the glyphs of the selected character on the output device according to the key points, the width values, the feature points, and the retrieved curve ratios.

28 Claims, 27 Drawing Sheets

US 6,501,475 B1

GLYPH-BASED OUTLINE FONT GENERATION INDEPENDENT OF RESOLUTION

FIELD OF THE INVENTION

The present invention relates to digital representations of typographic characters or other symbols, and more particularly, to a system, method, and computer-readable medium for generating outline fonts.

BACKGROUND OF THE INVENTION

Many font generating systems exist for generating Asian character fonts ("Asian fonts"). An Asian font is composed of a large number of ideographs that represent the characters in the Asian language. Asian languages may include thousands of characters. For example, the Chinese language includes over twenty-thousand distinct characters.

One conventional computer technique for generating character patterns in an Asian font uses font outlines. This system is described in "PostScript Language Tutorial and Cookbook" by Adobe Systems, Inc. (Addison-Wesley Publishing, 1985). In this method, the outline of a character pattern is stored as a collection of straight lines and curves. There are some disadvantages associated with this technique. First, because different font outlines must be defined and stored for tens of thousands of different characters, the memory requirement is relatively high. Second, the font outlines that are stored in high resolution are suited for display only in high resolution; they are not suited for high-quality display in relatively low resolution.

Another method of generating an Asian font uses stroke-based character pattern data, wherein each stroke within a character is defined separately. A character typically consists of multiple strokes that overlap or intersect with each other. Such stroke-based character pattern data include key points, width values, feature points, and curve ratios to define each stroke, and are described in U.S. Pat. No. 6,157,390 and U.S. Pat. No. 5,852,448, both assigned to the assignee of the present application and explicitly incorporated herein. This stroke-based technique is suited for reducing the memory requirements for fonts. Further, the stroke-based character font is well suited when extremely high-quality font display is required. However, the stroke-based font is not suited for font communication among different systems. Several strokes in a character that intersect or overlap with each other create a complicated overall geometric shape, which makes the filling in the shape's outline rather complicated. The processing of such a complicated shape becomes very difficult, especially when the font needs to be communicated between different systems having different resolutions. For example, a typical display character space is defined as 256×256, while a typical dot matrix printer has a character space of only 24×24.

SUMMARY OF THE INVENTION

The present invention provides a system, method, and computer-readable medium for generating a glyph-based outline font, which has a relatively low memory requirement and allows for font communication between various devices having different resolutions. As used herein, a glyph is a subunit of an Asian character, an Asian character typically consists of one or more glyphs. Each glyph, in turn, is formed of one or more strokes.

A method of the present invention first defines a set of basic glyphs, which will be used for defining characters. The characters defined by basic glyphs are suited for display on an output device having either high or low resolution. The method initially retrieves a set of characters that include similarly shaped glyphs. Next, the method selects one basic glyph that best represents the similarly shaped glyphs topographically. Then, the method defines feature points along the outline of the basic glyph. The method thereafter defines key points and width values. Key points are placed at edges or intersecting or bent portions of the basic glyph, so that moving the key points will change the outline shape of the basic glyph. Width values are also placed at locations within the basic glyph so that changing the width values will change the outline shape of the basic glyph. The method then defines equations that obtain the feature points based on the key points and the width values. Next, the method defines curve ratios and stores them in a curve level table. Curve ratios are stored according to various resolution levels, and designed to create curve segments between two consecutive feature points. Because curve ratios are stored at various resolution levels, the method is capable of creating high-quality curve segments regardless of the resolution level of a particular output device used. The method repeats these steps until all basic glyphs are defined, i.e., all glyphs in the set of characters are represented by at least one basic glyph.

In accordance with one aspect of the present invention, the method for defining basic glyphs further includes dividing the basic glyph into one or more single run-length regions. A single run-length region is a solid area within the basic glyph that contains no holes and can be filled with a single scan run. Thus, storing the basic glyph as a collection of several single run-length regions makes it simpler to fill within the basic glyph.

In accordance with another aspect of the invention, the steps included in the method for defining basic glyphs may be performed manually using a computer graphical user interface tool, or automatically using suitable image analysis techniques.

In accordance with yet another aspect of the invention, a method of defining a set of characters using a set of predefined basic glyphs is provided. As described above, basic glyphs are predefined by key points, width values, feature points that have predefined spatial relationship to the key points and width values, and curve ratios prestored in a curve level table. The method first retrieves a set of characters to be defined. Then, the method selects one character, and further selects one glyph out of the character. Next, the method retrieves a predefined basic glyph that most closely matches the selected glyph topographically. Thereafter, the method fits an outline shape of the retrieved basic glyph to an outline shape of the selected glyph by changing the key points and width values of the basic glyph. As noted above, the key points and width values have been predefined so that manipulation of these values will cause the outline shape of the basic glyph to transform. Next, the method stores the selected glyph with its key points and width values. The method repeats the above process until all glyphs in the set of characters are defined.

The method of defining a set of characters using a set of predefined basic glyphs can also be performed manually using a computer graphical user interface tool, or automatically using suitable image analysis techniques.

In accordance with a further aspect of the invention, the method of defining characters may identify a key point that requires a predetermined specific display location with respect to a bitmap cell upon which the key point falls. The method may label such a key point with hint information, to avoid jamming or distortion of a character upon display, in particular in low resolution.

In accordance with a still further aspect of the invention, a method of generating (rendering) characters that have been defined based on a set of basic glyphs for display is provided. The method allows for high-quality display of the characters regardless of a particular resolution level of an output device used. The method first selects a character for display on the output device. The character consists of one or more glyphs, and each glyph forming the character is predefined by key points, width values, feature points that have predefined spatial relationship to the key points and width values, and curve ratios prestored in a curve level table. Next, the method determines the resolution of the output device. Then, for each glyph forming the character, the method retrieves curve ratios from the prestored curve level table according to the determined resolution of the output device. Finally, the method renders the glyphs of the selected character on the output device according to the key points, the width values, the feature points, and the retrieved curve ratios.

In accordance with an even further aspect of the invention, rendering of a character for display includes filling within the outlines of the glyphs that form the character. Each glyph is predivided into one or more single run-length regions, so that filling within the glyph's outline includes filling each single run-length region separately at the time of output.

Accordingly, the present invention provides a method for generating a glyph-based outline font, which has a relatively low memory requirement and is well suited for font communication between various devices having different resolutions. Because the method defines and generates curve segments that define the outline of each glyph with greater detail at a higher resolution level, the method can produce a high-quality display in high resolution as well as in low resolution.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
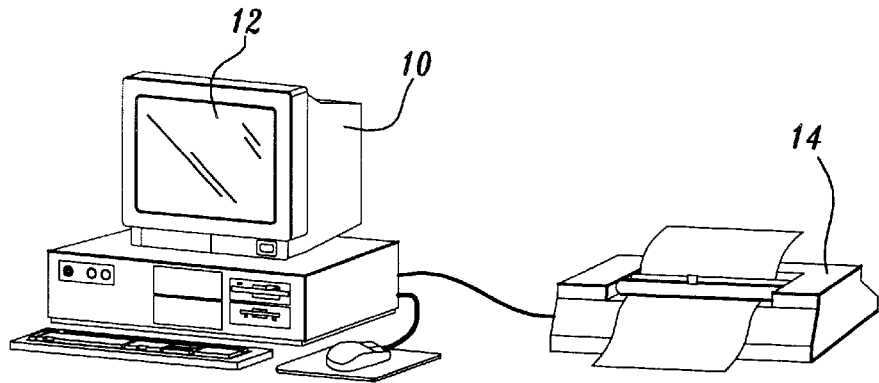
FIG. 1 is a block diagram depicting a general environment, in which the present invention operates.

FIG. 1 illustrates a typical computing environment, in which a method of the present invention may be implemented. A general purpose digital computer 10 including a display 12, which is attached to a printing device 14, is fully capable of performing the method of the present invention. The display 12 of the computer 10, the printing device 14, and any other output device (monitor, plotter, etc.) may display, print, and otherwise output the font generated in accordance with the present invention in either low- or high-quality resolution. Other types of computing systems, such as networked or mainframe-based systems, may also be used to carry out a method of the present invention, as apparent to those skilled in the art. The method outputs outline character data on devices having various levels of resolution from a single set of data.

Figure 2:
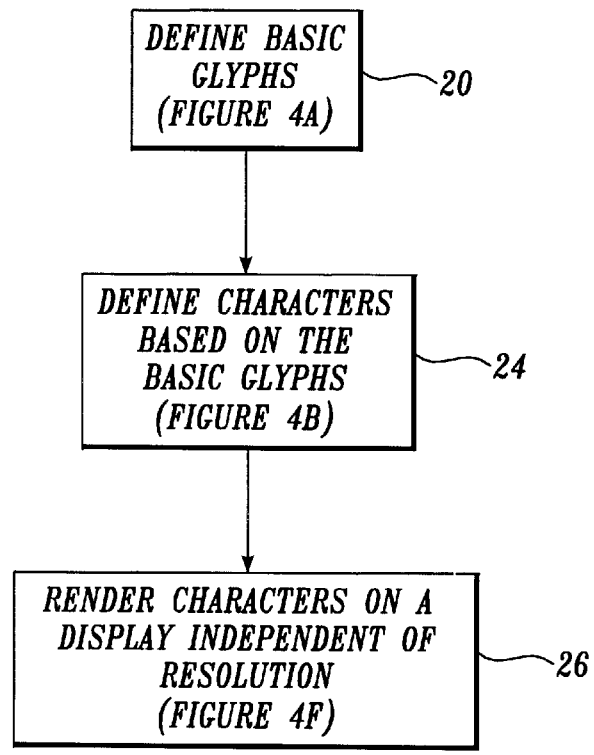
FIG. 2 is a flowchart illustrating basic components of a method of the present invention.
Figure 3A:
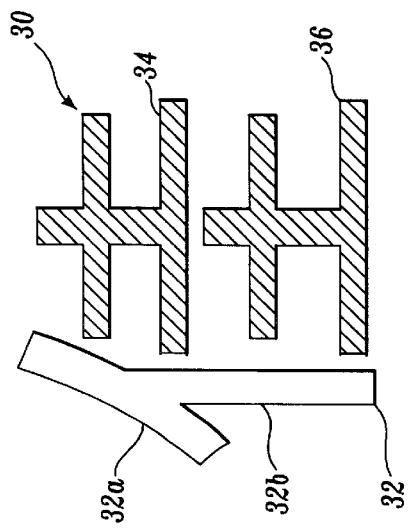
FIGS. 3A–3D depict sample Chinese characters, wherein each character includes a plurality of glyphs, and each glyph includes a plurality of strokes.
Figure 3B:
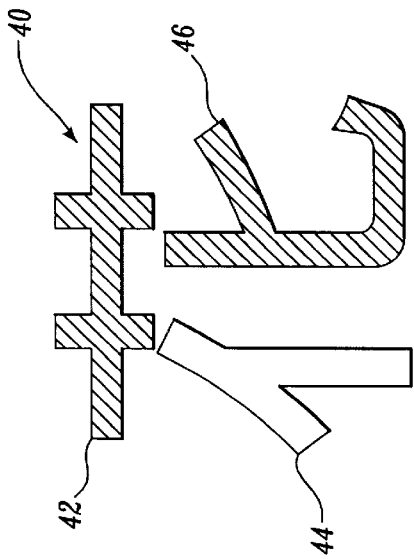
Figure 3C:
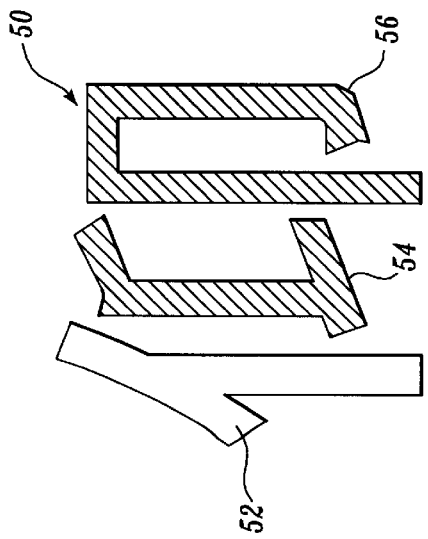
Figure 3D:
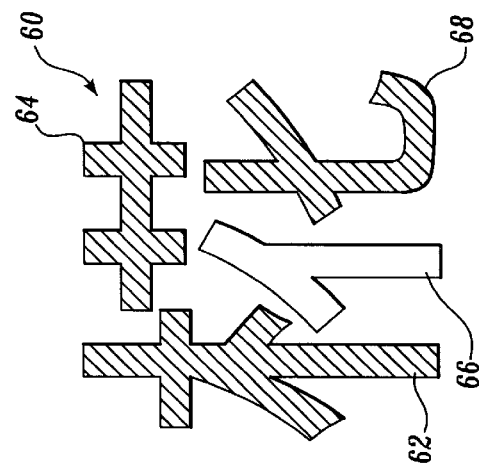

FIG. 2 illustrates basic components of a method of the present invention. The method includes a step of defining a finite number of "basic glyphs". See block 20. A glyph is a subunit of an Asian character; an Asian character typically consists of one or more glyphs. Each glyph, in turn, consists of one or more strokes. Referring to FIG. 3A, for example, a character 30 consists of three glyphs 32, 34, and 36; a character 40 in FIG. 3B consists of three glyphs 42, 44, and 46; a character 50 in FIG. 3C includes three glyphs, 52, 54, and 56; and a character 60 in FIG. 3D includes four glyphs 62, 64, 66, and 68. It is noted that the glyphs 32, 44, 52, and 66 (white portion in each character) all have the same topographical structure, consisting of a mildly curved slanting stroke 32a and a straight vertical stroke 32b in glyph 32. Thus, the four glyphs 32, 44, 52, and 66 can be defined based on a "basic glyph" (for example, the glyph 32), as slightly modified versions of the "basic glyph" 32. One of the features of Asian languages is that many glyphs are shared by many characters, and many glyphs share the same topographical structure, as demonstrated in FIGS. 3A–3D. Thus, by defining each character with glyphs, and further defining each glyph based on a "basic glyph", the method of the present invention significantly lowers the memory requirement needed to generate numerous Asian characters. Each of the defined "basic glyphs" is stored as a program for rendering the basic glyph for display. Briefly, the program includes equations that are used to generate an outline of a basic glyph, and an algorithm for filling in the outline of the basic glyph.

Next, at block 24, the method defines a set of characters in an Asian font, using the defined basic glyphs. As described above, each character consists of one or more glyphs, and every glyph is represented by at least one "basic glyph". Thus, the method defines each glyph within a character based on a basic glyph. This step will be more fully described below in reference to FIG. 4B.

Finally, when all characters in a font have been defined based on basic glypbs, the method renders the characters for high-quality display, regardless of the resolution level of a particular output device used. See block 26. This step will be described below in reference to FIG. 4F.

Figure 4A:
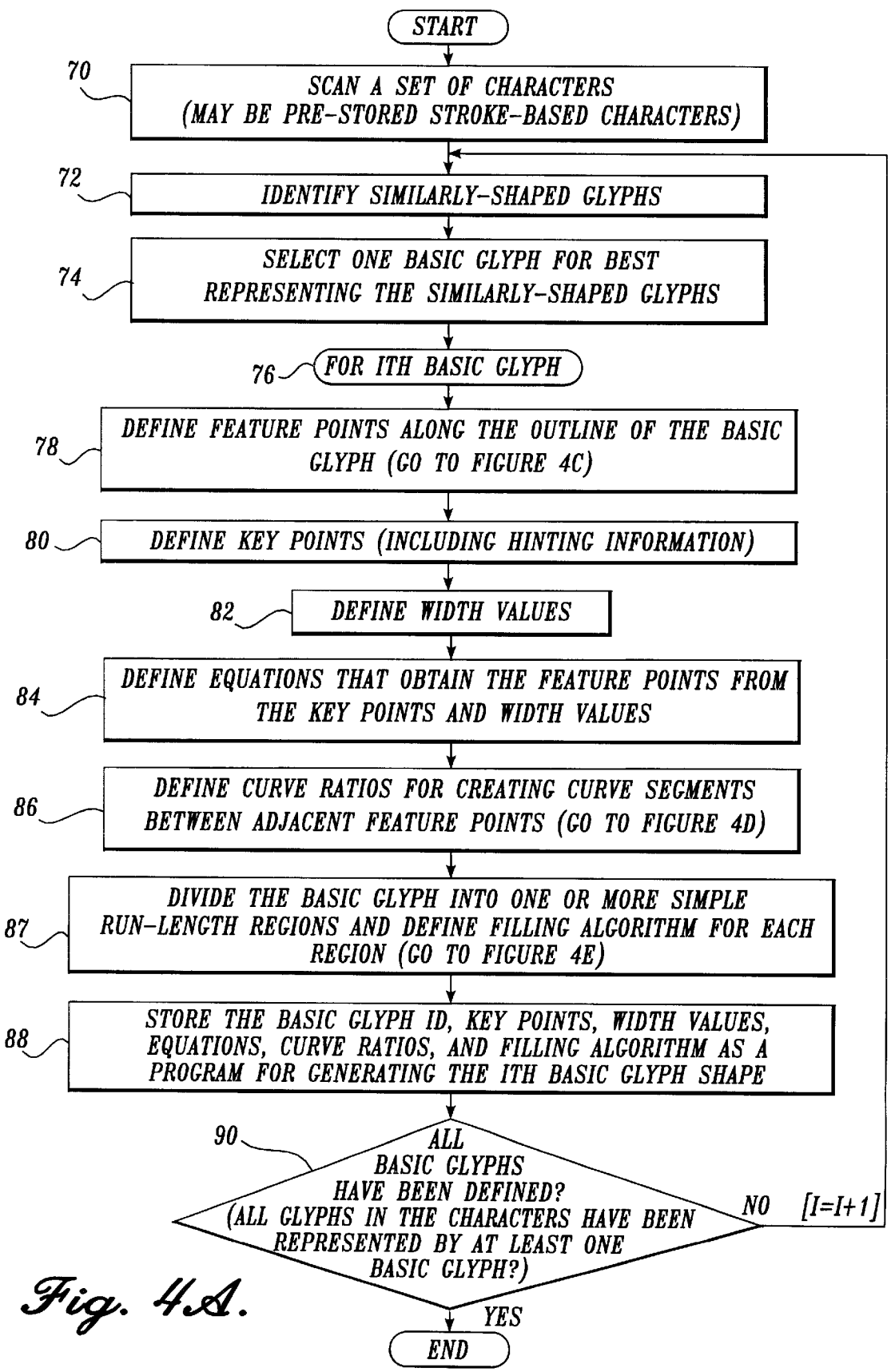
FIGS. 4A–4F are flowcharts depicting a method for the construction and generation of a glyph-based outline font, in accordance with the present invention.

FIGS. 4A through 4F illustrate a preferred embodiment of the present invention for producing glyph-based font data for high and low resolution character generation. The steps shown in FIG. 4A illustrate the process for defining a finite number of "basic glyphs", which are key components for defining various glyphs that constitute each Asian character.

At block 70, a font designer scans in or generates through the use of a graphic program a set of Asian characters. Other techniques may be used, provided that a set of character images or outlines is usable as a template. The set of characters are of the same font. If the characters are Chinese characters, the following are examples of different Chinese character fonts: text hand; running hand; cursive hand; seal type; Sung type; and Ming type. Optionally, the font designer may scan in characters that are predefined as stroke-based characters. The method of strokebased character definition is described in U.S. Pat. No. 6,157,390 and U.S. Pat. No. 5,852,448, both assigned to the assignee of the present application. Briefly, this method defines each stroke that forms a glyph (which in turn forms a character) with explicit data (key points, width values) and implicit data (feature points and curve ratios stored in a tree structure). The explicit and implicit data are also used in defining glyphs in the present invention and, thus, it may be advantageous to scan in prestored stroke-based characters because the same explicit and implicit data may be reused.

After a set of characters are scanned or generated as a template at block 70, at block 72, the method identifies a group of similarly shaped glyphs. The identification of similar glyphs may be done as simply as a font designer visually scanning the set of characters, or automatically scanning the set of characters by image analysis techniques as known in the art.

Next at block 74, the method selects one glyph out of a group of similarly shaped glyphs as a "basic glyph", which can best represent the topography of the similarly shaped glyphs within that group. Preferably, a "basic glyph" is selected as the most commonly appearing glyph within a group of similarly shaped glyphs. This step can also be performed either manually or automatically.

For example, using the set of characters in FIGS. 3A–3D as samples, the method first identifies similarly shaped glyphs 32, 44, 52, and 66 at block 72, and then selects glyph 32 as a "basic glyph" for representing these glyphs at block 74; or identifies similarly shaped glyphs 42 and 64, and selects glyph 42 as a "basic glyph" for representing these glyphs.

Next, at block 76, the basic glyph selected at block 74 is assigned a value "i" (i=integer). The method defines the $i^{th}$ basic glyph as follows:

$$G_i = f_i(\{k_j\}, \{w_m\}, L) \; i=1, \ldots, n \text{ (integer)}$$

G=basic glyph shape
i=basic glyph number
$f_i$=algorithm for producing $i^{th}$ basic glyph shape
k=key point location
j=key point number in $i^{th}$ basic glyph (integer)
w=width value
m=width value number in $i^{th}$ basic glyph (integer)
L=level of resolution L=0, 1, . . . (integer) The definition process is described below.

Figure 5:
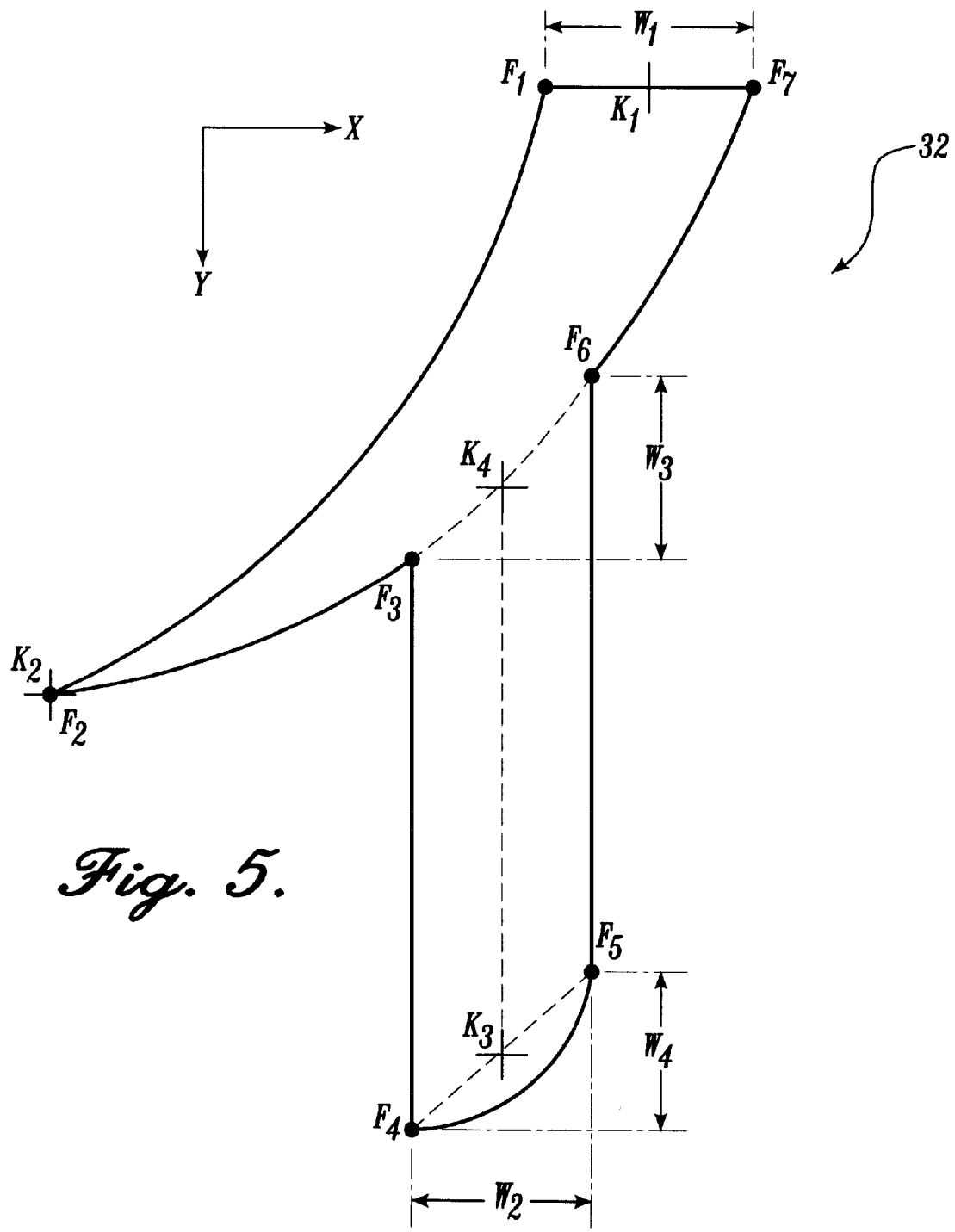
FIG. 5 depicts an exemplary glyph including key points, width values, and feature points.

First, at block 78, the method defines a plurality of feature points along the outline of $i^{th}$ basic glyph. The feature points are generally placed on the outline at locations where the outline changes its direction or curvature. Referring additionally to FIG. 5, for example, feature points $F_1$ through $F_7$ are defined on the outline of glyph 32. Feature points may be selected manually by a font designer.

Figure 6A:
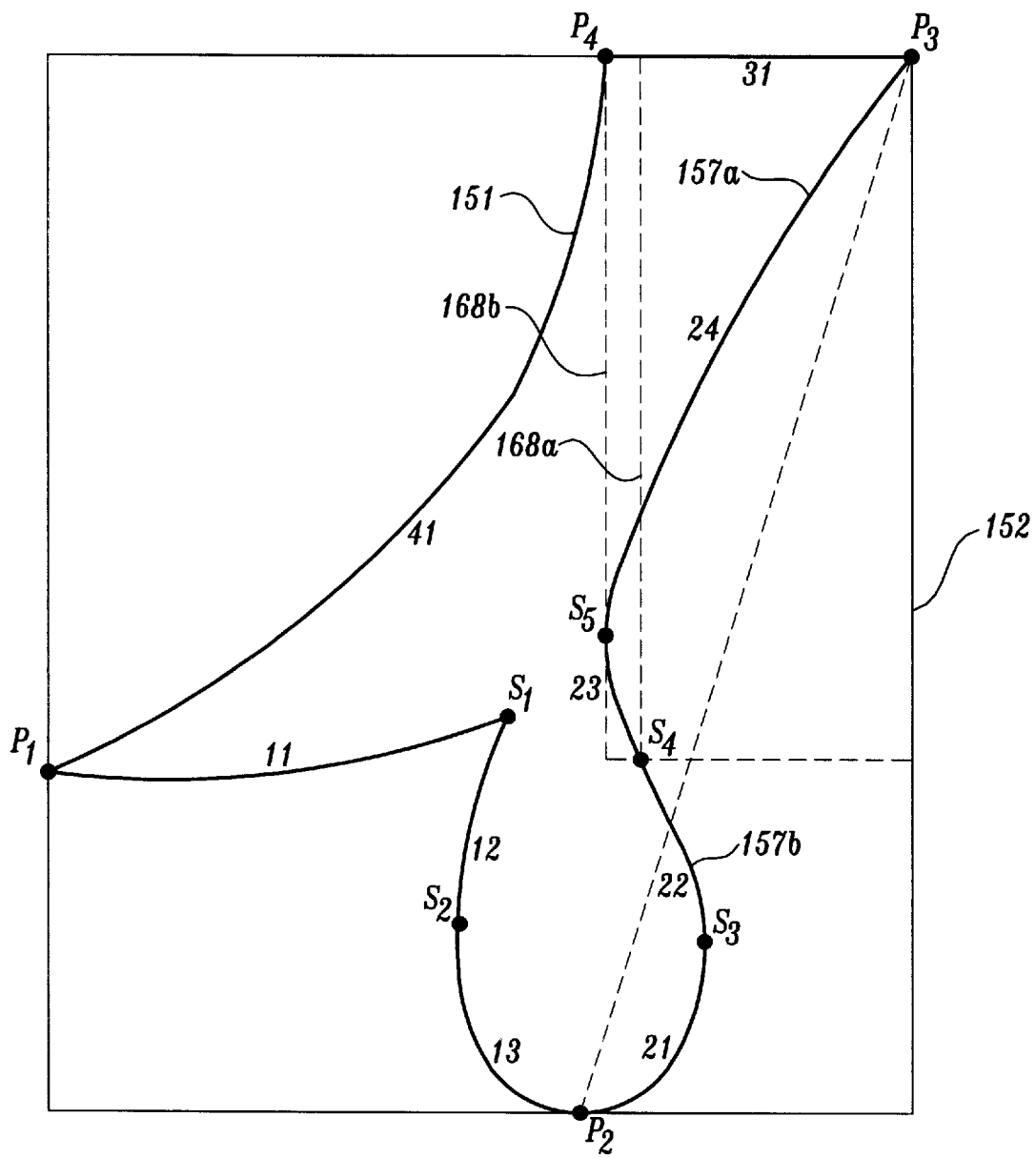
FIGS. 6A–6C illustrate a method of identifying feature points in accordance with the present invention.

Alternatively, feature points may be selected automatically. FIG. 4C illustrates steps involved in systematically identifying feature points on a glyph outline. At block 150, a basic glyph is fit within a minimum square. Referring additionally to FIG. 6A, for example, a glyph 151 is fit within a minimum square 152. Next, at block 153 in FIG. 4C, the method identifies four "primary" feature points at the leftmost, lowermost, rightmost, and uppermost edges of the minimum square. In FIG. 6A, four "primary" feature points $P_1$–$P_4$ are thus identified.

Next, at block 154, for each pair of adjacent "primary" feature points identified, the method determines whether all curve segments between the two points are on the same side of a line connecting the two points. See block 156. In FIG. 6A for example, it can be seen that two curve segments 157a and 157b do not lie on the same side of the line connecting two feature points $P_2$ and $P_3$. Then, at block 158, the method identifies inflection points as feature points (In FIG. 6A, feature point $S_4$.)

If at block 156 it is determined that all curve segments lie on the same side of a line between two feature points, or after all inflection feature points are identified at block 158, at block 160 the method determines if there are any acute angle points. In FIG. 6A, $S_1$ constitutes an acute angle point and, thus, is labeled as a feature point. See block 162. At this point, six feature points ($P_1, S_1, P_2, S_4, P_3$ and $P_4$) have been identified so far in FIG. 6A.

If at block 160 it is determined that there is no acute angle point, or after all acute angle feature points are identified, at block 163, the method forms a minimum square for each pair of adjacent feature points heretofore identified. Next, at a decision block 164, the method determines if any curve segments lie outside the minimum square. If so, at block 166, the method expands the minimum square until the square fittedly includes all the curve segments, and identifies feature points at any of the leftmost, lowermost, rightmost, and uppermost edges of the newly expanded minimum square. In FIG. 6A, for example, a minimum square 168a is formed between two adjacent feature points $S_4$ and $P_3$. It is noted that a curve segment lies outside the minimum square 168a. Thus, the method expands the minimum square 168a to a newly expanded minimum square 168b so as to include all curve segments within that are between the two feature points. Then, the method determines a feature point $S_5$ at the leftmost edge of the expanded minimum square 168b. Feature points $S_2$ and $S_3$ are identified in the same manner.

Next, optionally at block 170, the method displays the basic glyph with all identified feature points on a display device for verification. At block 172, a font designer determines if all feature points are properly identified. As noted above, feature points should be defined on the outline of a glyph where the outline changes its direction or curvature. If not all feature points are properly identified, at block 174, the font designer visually identifies proper feature points.

Figure 6B:
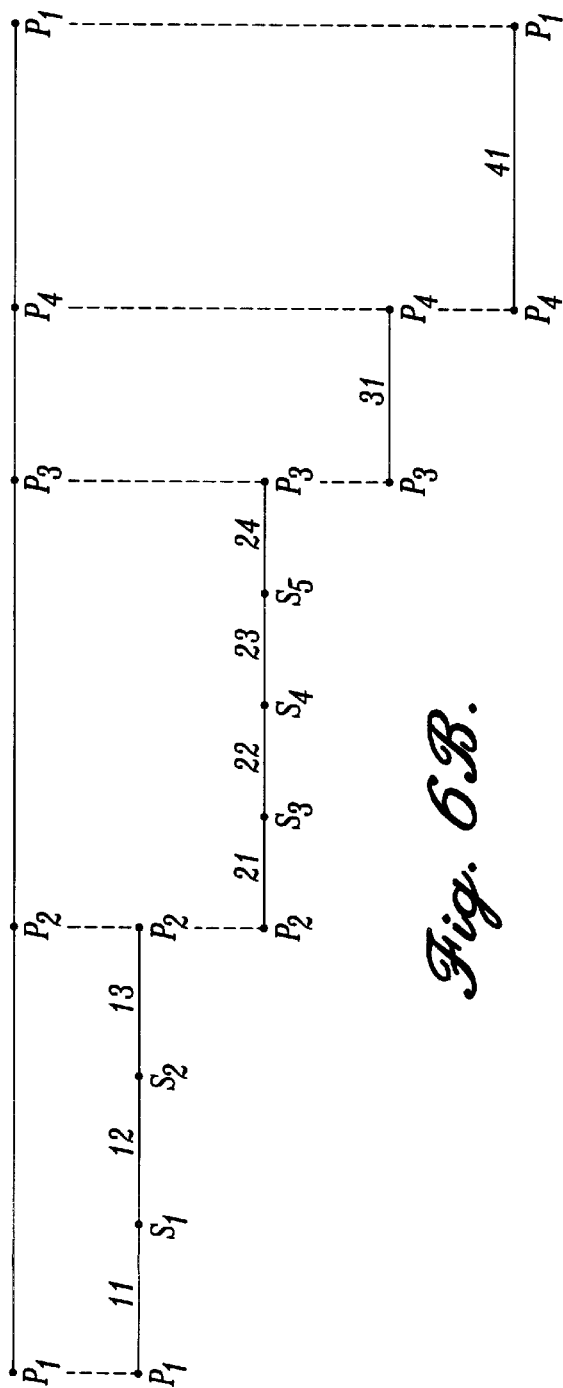
Figure 6C:
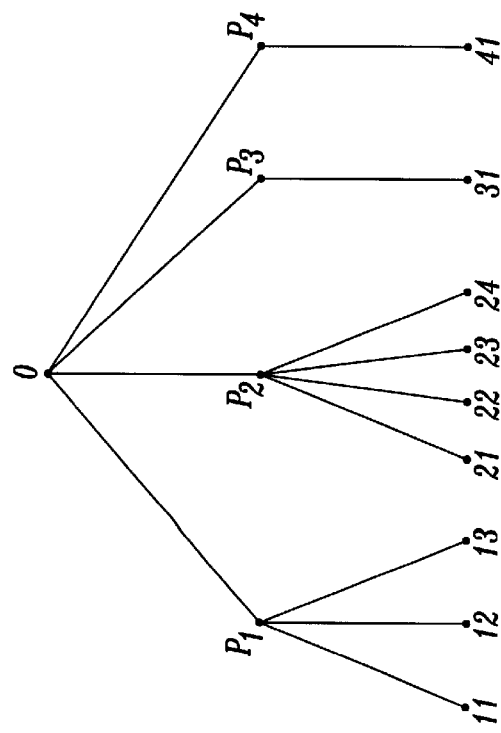

Once all feature points on a glyph outline are properly identified, the method stores all the feature points in the order along an outline tracing path. See block 176. In FIG. 6A, for example, the method may store feature points starting with $P_1$ and tracing the glyph outline counterclockwise toward $P_4$. FIG. 6B illustrates the order of occurrence of each feature point shown in FIG. 6A, and curve segments formed between consecutive feature points. Between feature points $P_1$ and $S_1$, a curve segment "11" is formed; between feature points $S_1$ and $S_2$, a curve segment "12" is formed; and so forth. It should be noted that tracing a glyph outline may start from any feature point, and tracing may be either clockwise or counterclockwise. FIG. 6C illustrates the feature points shown in FIG. 6B in a tree structure. The structure in which the feature points of a basic glyph are arranged is termed "glyph signature". It is noted that the "glyph signature" is the same for all glyphs that one basic glyph can represent.

Once all feature points are identified, next returning to block 80 of FIG. 4A, the method defines and stores "key points" of the $i^{th}$ basic glyph. Referring to FIG. 5, key points $K_1$ through $K_4$ are defined. The key points are defined in a position relative to the topographic layout of the basic glyph, and based on a number of observed features of the similarly shaped glyphs that the basic glyph represents. The key points may be defined by a font designer manually, or may be defined automatically by an image analysis software based on a predefined set of rules. Key points are placed in, on, or outside a basic glyph so that one can manipulate the shape of the basic glyph by moving the key points. Generally, key points are placed at the beginning and terminus of a basic glyph and at any location where a basic glyph changes direction abruptly. Key points are positioned to allow elongating, stretching, or warping the basic glyph's ends or other sections in order to modify the shape of the basic stroke to match any of the set of similarly shaped glyphs that the basic glyph represents. The minimum number of key points for a glyph is two. The method of moving key points to change the shape of a basic glyph will be more fully described below.

Also at block 80, a certain key point that needs to be displayed at a particular location with respect to the bitmap cell, upon which the key point falls, may be labeled with "hint information". Briefly, labeling a key point with "hint information" will prevent distortion or jamming of a font character when it is rendered on an output device, as more fully described below.

Next, at block 82, the method designates and stores at least one width value for the basic glyph. In FIG. 5, width values $W_1$ through $W_4$ are defined. Again, where to assign width values within a basic glyph can be determined manually by a font designer, or automatically by an image analysis software according to a predefined set of rules. Width values are defined based on observed widths of similarly shaped glyphs that a basic glyph represents. Similarly to key points, width values should be defined so that one may manipulate the shape of the basic glyph to match any of the similarly shaped glyphs that the basic glyph represents by changing the width values (i.e., by decreasing or increasing the width values). The method of manipulating width values to change the shape of a basic glyph will be more fully described below.

Once the key points and width values are defined, at block 84, the method obtains equations that obtain the feature points (defined at block 78) from the key points and width values (defined at blocks 80 and 82, respectively). Referring to FIG. 5, letting $F=(|F|_x, |F|_y)$ represent the X-Y location of a feature point; $K=(|K|_x, |K|_y)$ represent the X-Y location of a key point; and W represent a width value, the feature points ($F_1$–$F_7$) can be obtained using the following equations:

$$|F_1|_x = |K_1|_x - \tfrac{1}{2}W_1;\ |F_1|_y = |K_1|_y \tag{1}$$

$$|F_2|_x = |K_2|_x;\ |F^2|_y = |K_2|_y \tag{2}$$

$$|F_3|_x = |K_4|_x - \tfrac{1}{2}W_2;\ |F_3|_y = |K_4|_y + \tfrac{1}{2}W_3 \tag{3}$$

$$|F_4|_x = |K_3|_x - \tfrac{1}{2}W_2;\ |F_4|_y = |K^3|_y + \tfrac{2}{3}W_4 \tag{4}$$

$$|F_5|_x = |K_3|_x + \tfrac{1}{2}W_2;\ |F_5|_y = K_{3y} - \tfrac{1}{3}W_4 \tag{5}$$

$$|F_6|_x = |K_4|_x + \tfrac{1}{2}W_2;\ |F_6|_y = |K_{4y} - \tfrac{1}{2}W_3 \tag{6}$$

$$|F_7|_x = |K_1|_x + \tfrac{1}{2}W_1;\ |F_7|_y = |K_1|_y \tag{7}$$

At block 86, the method defines curve ratios for creating curve segments between adjacent feature points. Curve ratios express how a curve segment between a pair of consecutive feature points is to be rendered at various levels of resolution. In a present embodiment of the invention, the well-known Bezier curve generation algorithm is used to describe curve segments, by filling a curve level table with curve ratios at different resolution levels.

Figure 7C:
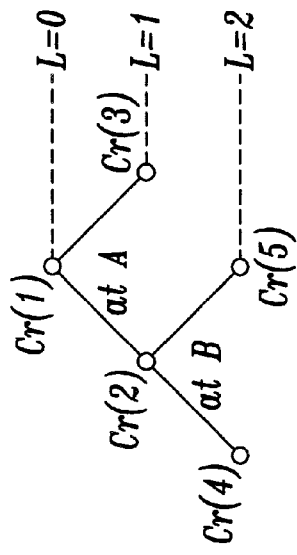
FIGS. 7A–7C illustrate a method of defining curve segments in accordance with the present invention.
Figure 7B:
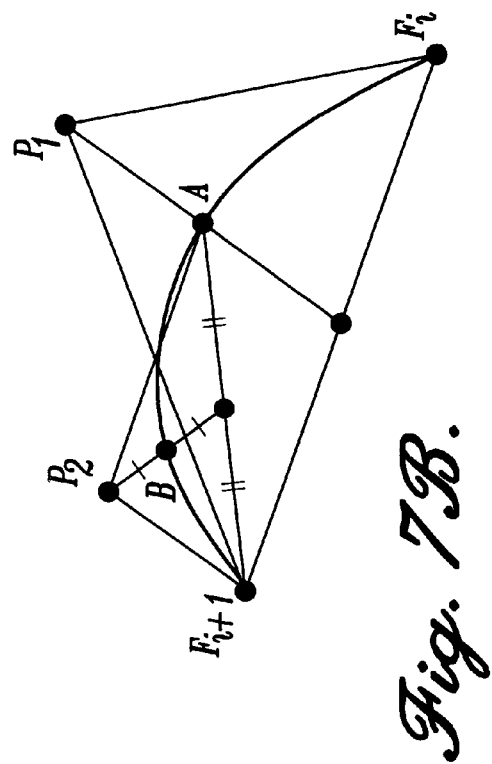
Figure 7A:
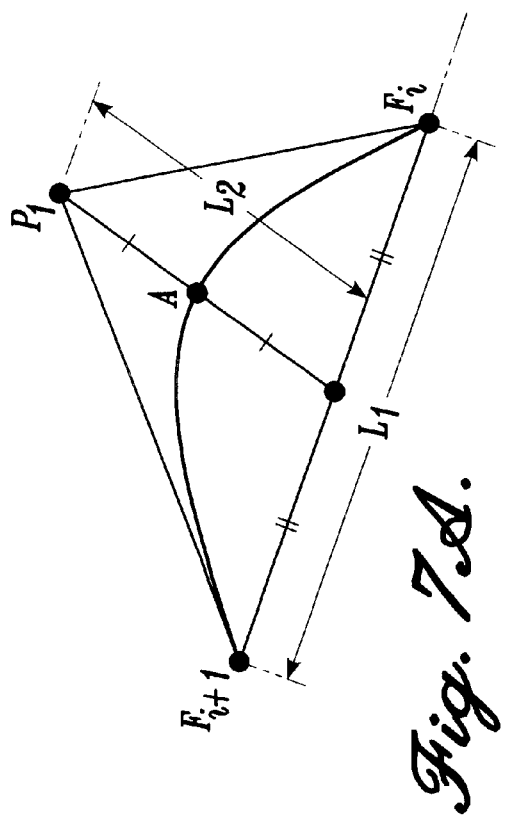

FIG. 7A illustrates a second-order Bezier curve geometry. Second-order Bezier curve generation creates a triangle between two feature points $F_i$ and $F_{i+1}$ and a movable midcontrol point $P_1$. The midcontrol point $P_1$ is placed so that the defined curve segment will most closely match the desired curve line. Then, the midcontrol point $P_1$ and the midpoints of a line $L_1$ connecting the two feature points are connected to form a line $L_2$. A curve segment is generated so as to be tangent to both lines $P_1F_i$ and $P_1F_{i+1}$ at points $F_i$ and $F_{i+1}$, respectively, and also to pass through the midpoint A of the line $L_2$. Here, a curve segment $C(r)$, where "r" represents a particular curve ratio, can be defined as:

$$C(r)=(Cr(x), Cr(y)) \tag{8}$$

where $$Cr(x)=L_2(x)/L_1(x)$$

and $$Cr(y)=L_2(y)/L_1(y)$$

Thus, referring additionally to FIG. 7C, the curve segment shown in FIG. 7A is defined as Cr(1) (the first curve segment). This curve segment is associated with "0" level resolution (L=0), and stored in a tree-structure curve level table.

When the curve segment needs to be further defined for better quality display in a high-resolution output device, as shown in FIG. 7B, the curve segment is split further into two separate curve segments, and each curve segment may be defined using the Bezier curve technique. Specifically, in FIG. 7B, a second-order Bezier curve is generated by forming a triangle between midpoint A, a feature point $F_{i+1}$, and a movable midcontrol point $P_2$. As before, a curve segment is defined so as to be tangent to both lines $P_2A$ and $P_2F_{i+1}$ at points A and $F_{i+1}$, respectively, and to pass through the midpoint B. This curve segment is defined as Cr(2). The other curve segment between feature points A and $F_i$ is defined as Cr(3). The two finer curve segments Cr(2) and Cr(3) are then stored at level resolution "1". Referring to FIG. 7C, the curve segment Cr(2) may further be split into two curve segments Cr(4) and Cr(5) for further, finer definition, and these curve segments are stored at level resolution "2". As shown, each curve segment is associated with a particular resolution level (L=0, 1, 2).

By thus defining curve segments according to different levels of resolution, the present invention allows for high-quality output of characters regardless of the resolution level of a particular output device used. A font designer can define in greater detail a curve between two feature points by generating a greater number of curve segments between the two feature points. Greater detail is more important for generating a character for a high-resolution display, since a high-resolution display requires greater detail for characters than does a low-resolution display. For example, still referring to FIG. 7C, if resolution level L is "0" (low), only curve segment Cr(1) is retrieved. If L is "1", curve segments Cr(2) and Cr(3) are retrieved. If L is "2" (high), curve segment Cr(3), which is not further defined beyond resolution level "1", and curve segments Cr(4) and Cr(5) are retrieved.

Figure 4B:
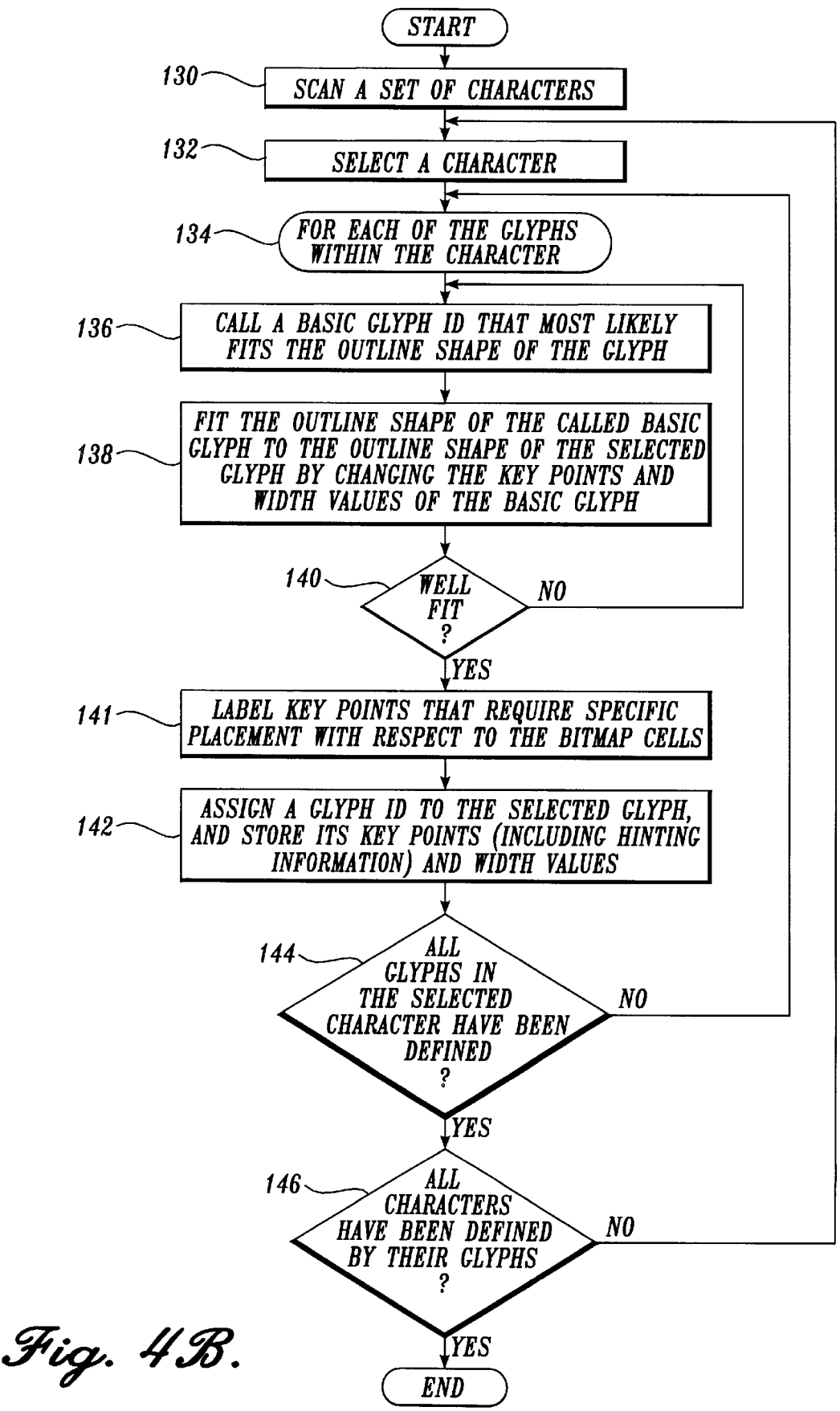
Figure 4C:
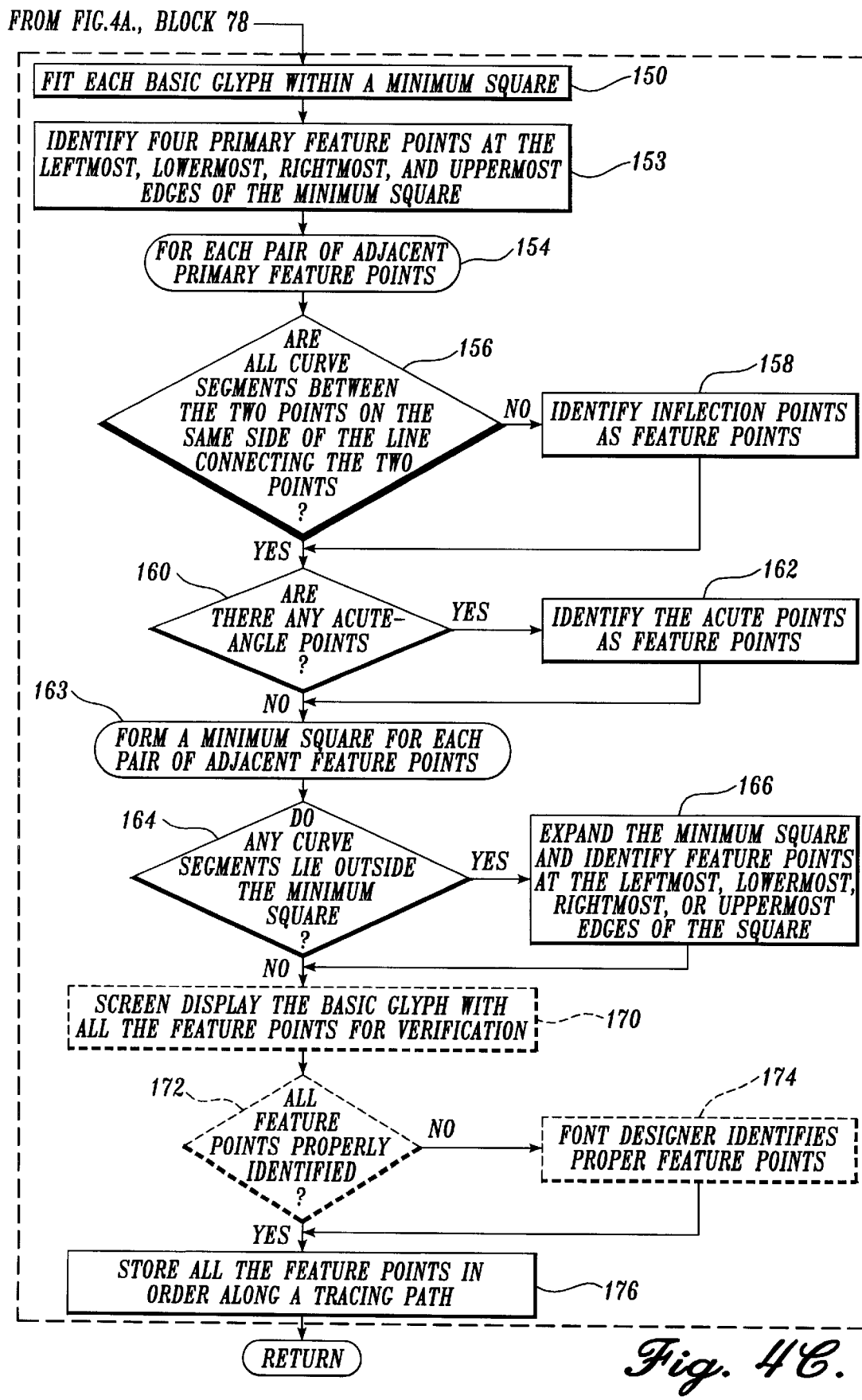
Figure 4D:
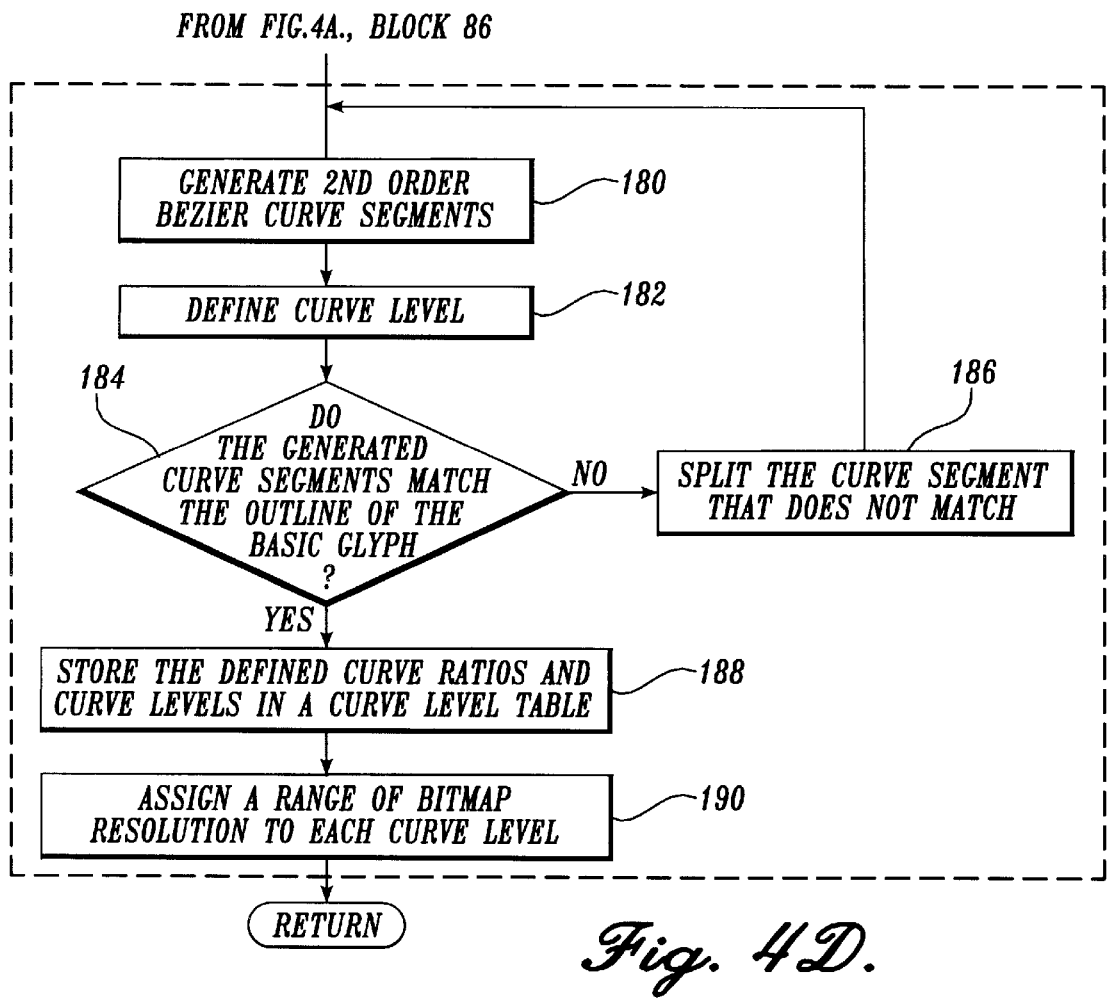

FIG. 4D illustrates the curve segment definition, as described above, in a flowchart. At block 180, the method defines one or more second-order Bezier curve segments. At block 182, the method assigns a curve level to the Bezier curve segments. Then at block 184, the method determines if all the defined curve segments match the outline of a basic glyph. If not, at block 186, the method splits the curve segment that does not match well, further, into more curve segments, and back at block 180, using the second-order Bezier curie technique to define each of the split curve segments. Then, at block 182, the method assigns another curve level to the newly defined curve segments, and at block 184, determines if the newly created curve segments now match the outline of the basic glyph. This process repeats until the curve segments are determined to match the outline. Then, at block 188, the method stores all the curve ratios, together with the curve level associated therewith, in a tree-structure curve level table. At block 190, the method assigns a range of bitmap resolution to each curve level, as more fully described below.

Figure 8:
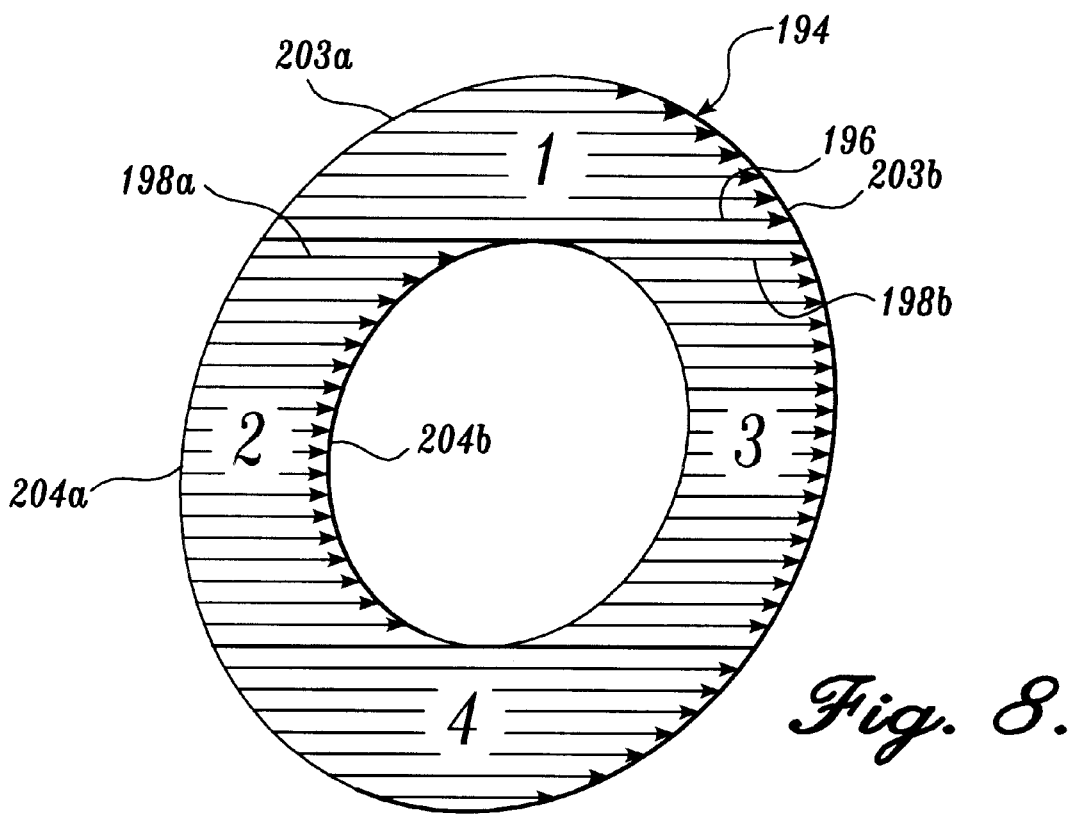
FIG. 8 illustrates a method of defining single run-length regions within an exemplary basic glyph, for filling in the outline of the basic glyph.

Once all curve segments are defined, returning back to FIG. 4A, at block 87, the method divides the basic glyph into one or more single run-length regions. A single run-length region is defined as a solid area within a basic glyph that includes no hole within and, thus, can be filled with a single scan run. Division of a basic glyph into single run-length region(s) therefore serves to make it simpler to fill within the outline shape of a basic glyph. Referring to FIG. 8, for example, a sample basic glyph shape 194 can be divided into four single run-length regions, 1 through 4. Region 1, for example, forms a single run-length region, which can be filled in by a single scan run, as indicated by an arrow 196. The midsection of the glyph 194 is divided into two regions 2 and 3, since two separate scan runs, as indicated by arrows 198a and 198b, are required to fill in the entire midsection. Then, for each of the single run-length regions thus created, the method defines a filling algorithm.

Figure 4E:
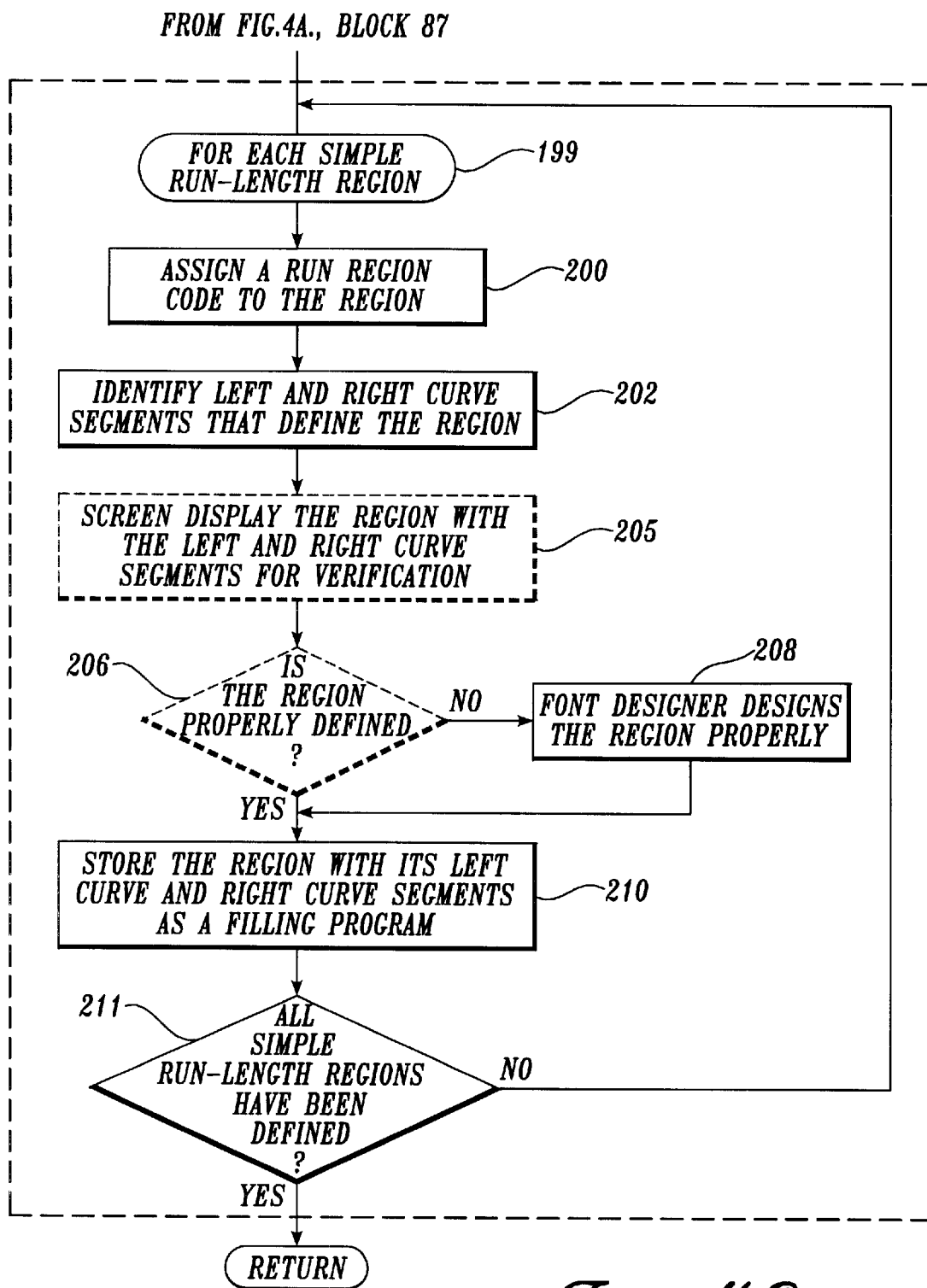

Referring to FIG. 4E, at block 199, to define the filling algorithm for each of the single run-length regions, the method first assigns a run-region code to the region at block 200. At block 202, the method identifies left and right curve segments that define the region. In FIG. 8, for example, the region "1" is defined by {left curve segment=203a, right curve segment=203b}, where the curves 203a and 203b have been previously defined at block 86 of FIG. 4A. Similarly, the region "2" is defined by {left curve segment= 204a, right curve segment=204b}, and so forth. Thus structured, filling within the outline of the glyph 194 upon display becomes simple, since filling can take place at each node (single run-length region) separately, in an orderly fashion.

Next, optionally at block 205, the method displays the single-run length region with its left and right curve segments on a screen for a font designer's verification. At block 206, a font designer determines if the region is properly defined. If not, at block 208, the font designer manually defines the region properly. K on the other hand, the region is determined to be properly defined, then at block 210, the method stores the region with its left and right curve segments as a filling program. The method then determines if all single run-length regions have been defined at block 211. If not, the method returns to block 199, and defines a filling algorithm for another single run-length region. If it is determined that all single run-length regions have been defined at block 211, the method returns to block 87 of FIG. 4A.

Once all the basic glyphs have been thus completely defined, at block 88, the method stores the $i^{th}$ basic glyph identification (ID), the key points, the width values, the equations for obtaining feature points from the key points and width values, the curve ratios stored in a curve level table, and the filling algorithm for the basic glyph as a program for rendering that basic glyph for output.

Next, at block 90, the method determines whether all basic glyphs have been defined and stored as programs. In other words, the method determines if all glyphs in the set of characters have been represented by at least one basic glyph. If not, the method returns to block 72, and defines another basic glyph in the same manner as described.

If all basic glyphs have been thus defined, the database, including a set of programs for rendering all basic glyphs, may be provided for purchase and use by a graphics designer for generating a set of characters. The method of generating a set of characters based on the predefined basic glyphs is now described.

FIG. 4B illustrates the steps performed by a user for generating characters in a font, using the predefined basic glyphs. A user is typically a graphic designer attempting to create a font database for commercial use. At block 130, the user first scans a new set of characters in a font, for use as templates. At block 132, the user selects a character from the scanned set of characters. At block 134, the user selects a glyph within the selected character. For that glyph, at block 136, the user retrieves from a list of predefined basic glyphs one basic glyph that most closely matches the outline shape of the selected glyph. At block 138, the shape of the selected basic glyph is then modified, by a font designer moving the key points or changing the width values of the basic glyph, to match the outline shape of the selected glyph. As described above, key points and width values are defined so that one can change the outline shape of a basic glyph by moving the key points and changing the width values. When key points are moved or width values are changed, the locations of feature points will also vary automatically, according to the equations obtained at block 84 of FIG. 4A, which define the spatial relationship of the feature points to the key points and width values. When the feature points are moved, curve segments between adjacent feature points will also change their shapes according to their respective curve ratios. Thus, manipulating key points and width values will change the outline of a glyph, since the glyph's outline is defined by a collection of curve segments. The method of basic glyph shape manipulation will be more fully described below in reference to screen shots of a graphic user interface tool.

Next, at block 140, the method determines if the modified basic glyph outline shape well matches the outline shape of the selected glyph. If not, the method returns to block 136 and selects another basic glyph that most likely matches the outline shape of the selected glyph. If the selected basic glyph well matches the shape of the selected glyph, the new (modified) values of key points and width values become the key points and width values of the selected glyph. Then at block 141, the method determines if any key point of the selected glyph requires labeling with "hint information" below a certain resolution level.

Hint information is labeled when a newly defined glyph with key points and width values, which have been changed from those of a basic glyph, is observed in a low-resolution character space. If the observed glyph requires specific placement within the character space in order to avoid poor display quality, the key points of that glyph are labeled with hint information for future display processing. Hint information forces each labeled key point to be at a particular location with respect to the bitmap cell upon which the key point falls, so as to avoid jamming of a displayed glyph or to maintain symmetry of the glyph upon display.

Figure 9A:
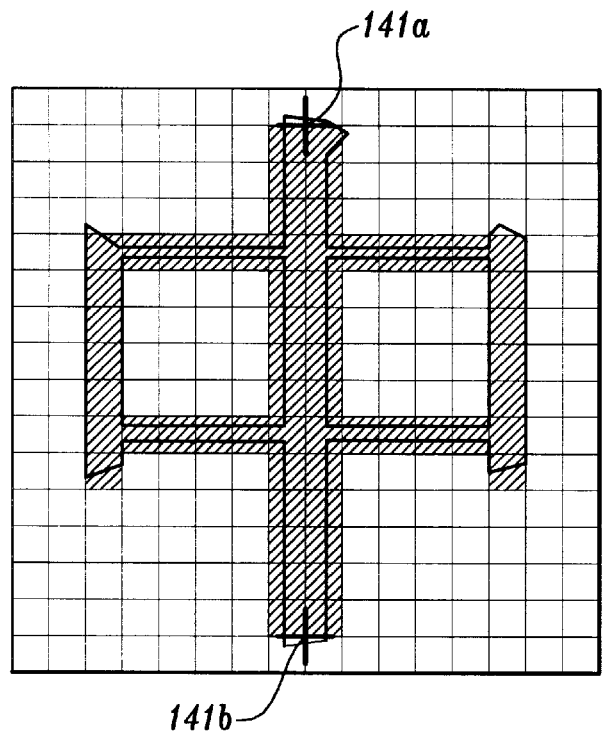
FIGS. 9A and 9B are illustrations of a character on display with unlabeled and labeled key points, respectively.
Figure 9B:
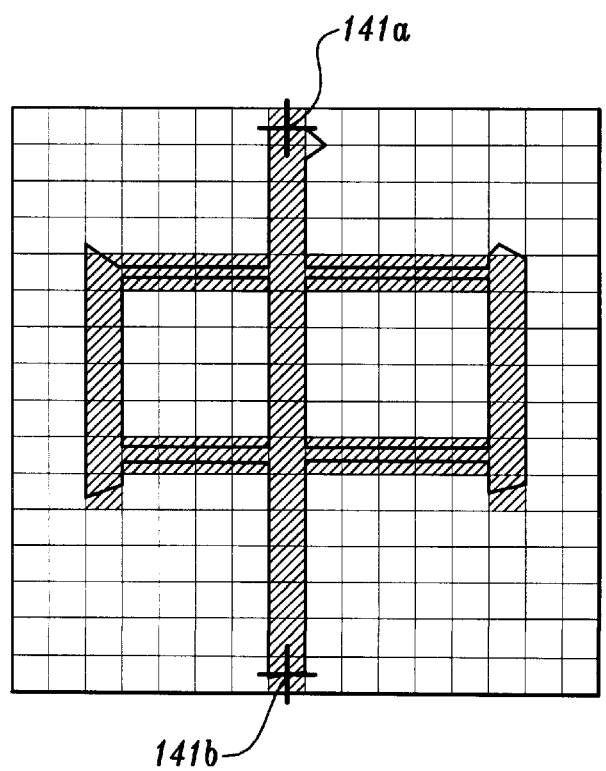

FIGS. 9A and 9B illustrate the contrast of unlabeled and labeled key points. In FIGS. 9A and 9B, a glyph outline is shown in a solid line, and screen bitmap cells that are activated by the glyph outline for display are shown as crosshatched area. Typically, a bitmap cell is activated when at least 50% of the bitmap cell area is covered by a glyph outline. In FIG. 9A, key points 141a and 141b are unlabeled. As a result, the vertical middle stroke of a displayed glyph activates two columns of bitmap cells because its outline covers at least 50% of the bitmap cells of both of these columns. This is not desirable since the rest of the displayed glyph is shown with a single-column or single-row width.

In contrast, as shown in FIG. 9B, when key points 141a and 141b are labeled so as to be centered within a display bitmap cell, the key points are moved to the center of the bitmap cells and, thus, the vertical middle stroke of the displayed glyph activates only one column of display bitmap cells.

It should be understood that centering a key point within a bitmap cell is only one example of use of hint information. Hint information may be used, for example, for forcing a key point to fall on the edge of a bitmap cell, or at any other position with respect to a bitmap cell.

The font designer can designate the resolution level, at which hint information will be used during display processing of the stored glyphs. This may be preferable since hinting may not be required when the stored glyphs are displayed on a high-resolution output device. For example, if the font designer designates Level 1 as a hint information active level, all levels below (lower resolution levels) and including Level 1 will exhibit active hinting of key points that are labeled with hint information.

Once hinting is performed, at block 142, the method assigns a glyph ID to the selected glyph, and stores its key points, including hint information, and its width values. At block 144, the steps of selecting and matching a basic glyph to a glyph within the selected character are repeated until all the glyphs within the character have been defined. At block 146, the steps of defining a selected character using pre-defined basic glyphs continue until all the characters within the font set have been defined.

Figure 4F:
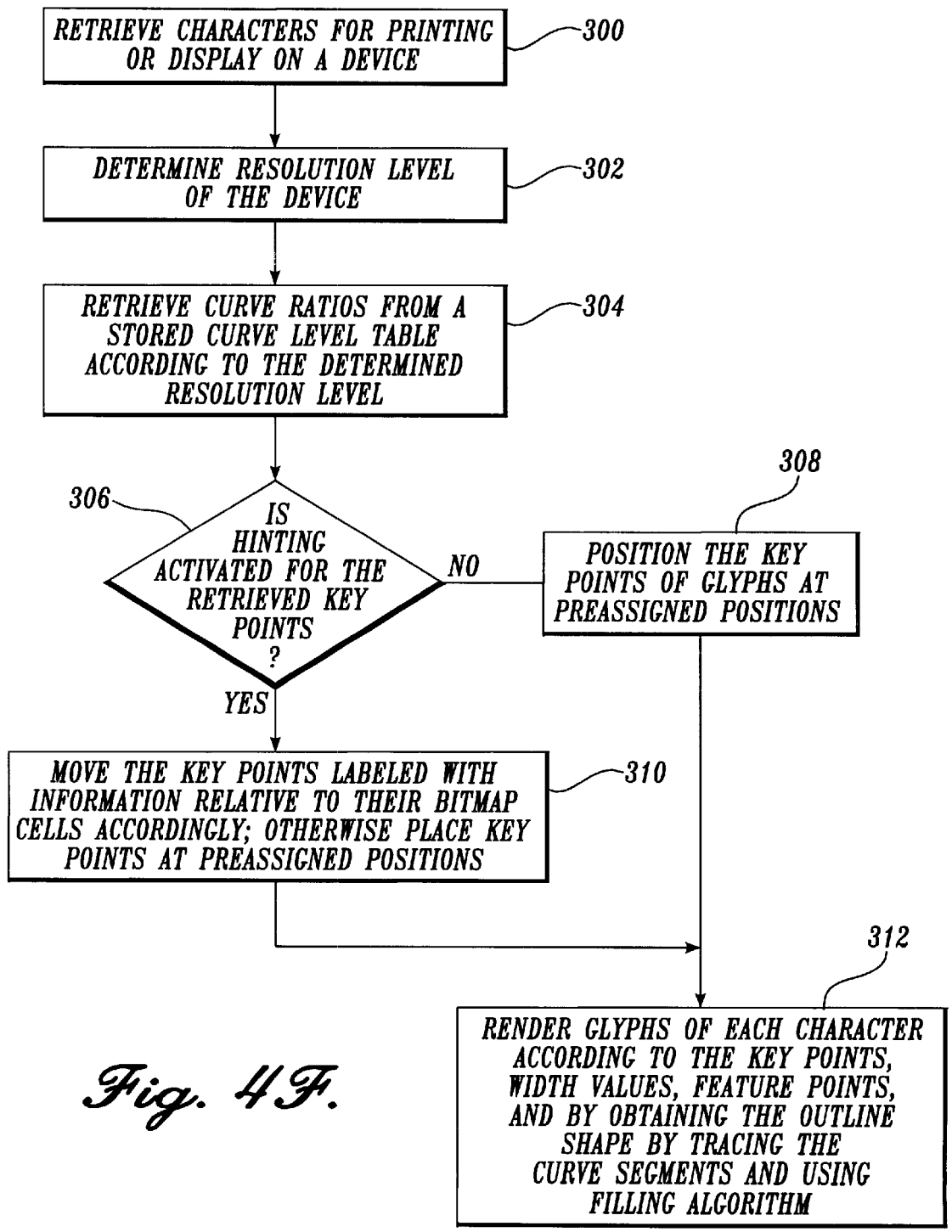

FIG. 4F illustrates the method of rendering for display those characters that are defined according to the present invention. The font rendering process is essentially the reverse process of the font creation techniques that have been described above. The steps shown in FIG. 4F are performed by an image-rendering program/engine in a computer, for display on a low- or high-resolution display device or for printing on a low- or high-resolution printer. At block 300, the method retrieves characters for printing or display by selecting the characters in an application program, such as a word processing program. At block 302, the method determines the resolution level of the printer or display device. At block 304, curve ratios are retrieved for each of the glyphs forming the characters from a stored curve level table according to the determined resolution level of the printer or display device.

At a decision block 306, the system determines if hinting is activated for the retrieved key points included in the character (i.e., a set of glyphs) at the particular resolution level of the printer or display device. If hinting is not activated, at block 308, all key points of the glyphs of the retrieved characters are placed according to their preassigned positions on the display device. If, on the other hand, hinting is activated, at block 310 the labeled key points are moved and fixed to the particular location with respect to their bitmap cells, and the nonlabeled key points are fixed to their preassigned positions. Finally, at block 312, the glyphs are rendered according to the determined key point positions and stored width values. Feature points are calculated according to the key points and width values. Curve segments between the calculated feature points are calculated according to the curve ratios retrieved from the curve level table. The curve ratios are retrieved from the curve level table according to the determined resolution level of the particular output device. The curve segments are then traced to form the outline shape of the glyphs. Finally, a filling algorithm fills the area within the glyph outline. Since each glyph is divided into one or more single run-length regions, as discussed above, filling within the glyph outline involves filling each of the single run-length regions separately. The filling algorithm activates a bitmap cell according to pre-defined criteria. For example, a bitmap cell may be activated (filled) if at least 50% of the bitmap cell is covered by the area within the calculated glyph outline or if the center of a bitmap cell is within the calculated glyph outline.

The present invention may be practiced using a graphical user interface (GUI) CAD tool. The following describes operation of such a GUI tool, for use in a Windows®-based operating system. It should be understood that a GUI tool suitable for use in the present invention can be implemented in various other types of operating systems. It is also noted that the method performed by a CAD tool in the following description can be performed automatically using image analysis techniques.

Figure 10:
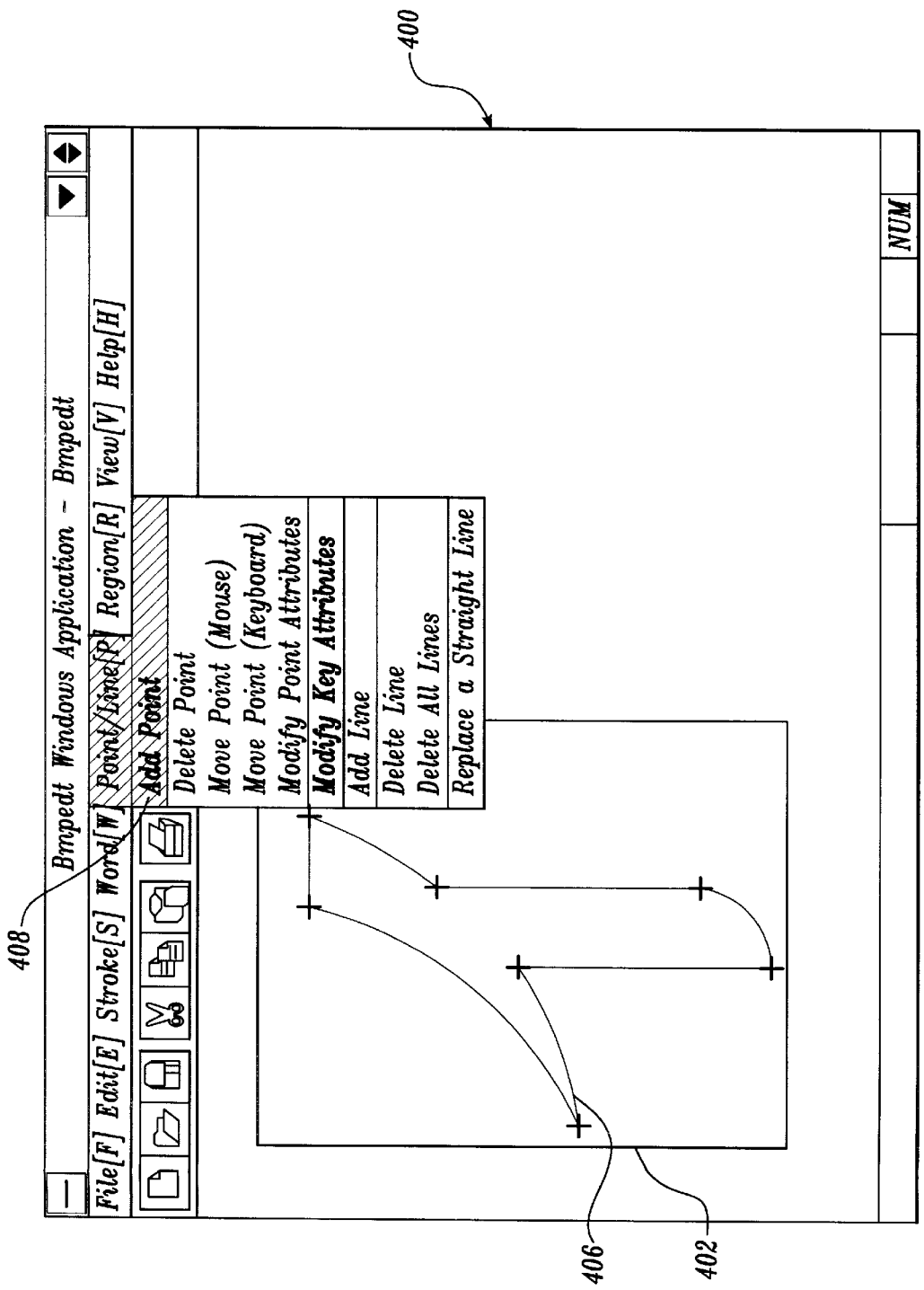
FIG. 10 is a screen shot of a designer CAD tool used for defining feature points.

FIG. 10 illustrates the method of defining feature points using a GUI tool. In FIG. 10, a GUI CAD tool 400 includes a title, main menu, buttons, and 2-dimensional display area 402 in accordance with a typical Windows®-based application. In the display area 402, a glyph 406 is displayed. To define a feature point, a font designer selects "Add Point" command 408 from the CAD tool menu, and places a cursor on the glyph's outline where the designer wishes to place a feature point. By clicking a mouse, for example, the feature point can be defined. In the display area 402, defined feature points are identified as "+" marks.

Figure 11A:
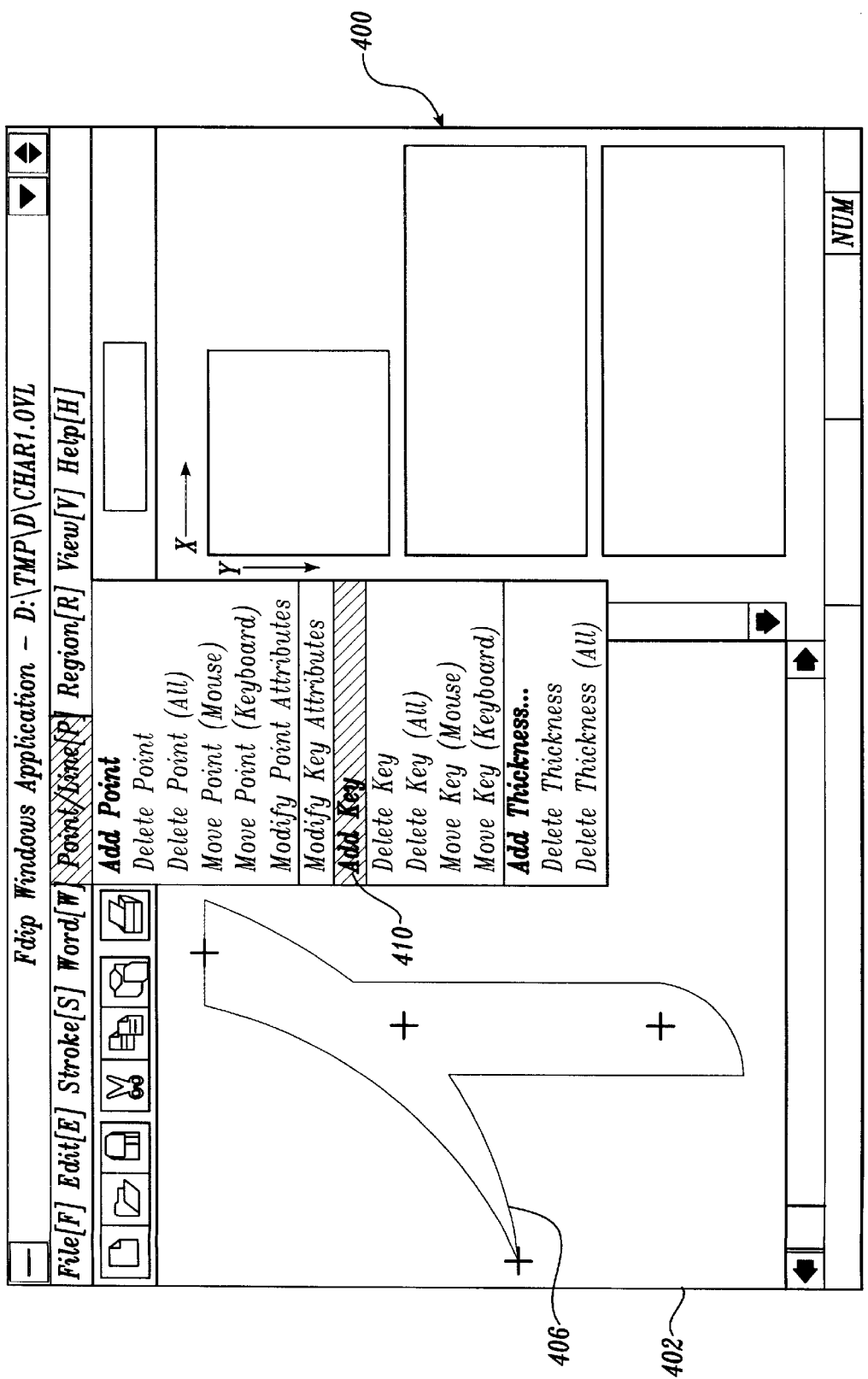
FIGS. 11A–11C are screen shots of a designer CAD tool used for defining key points and width values.
Figure 11B:
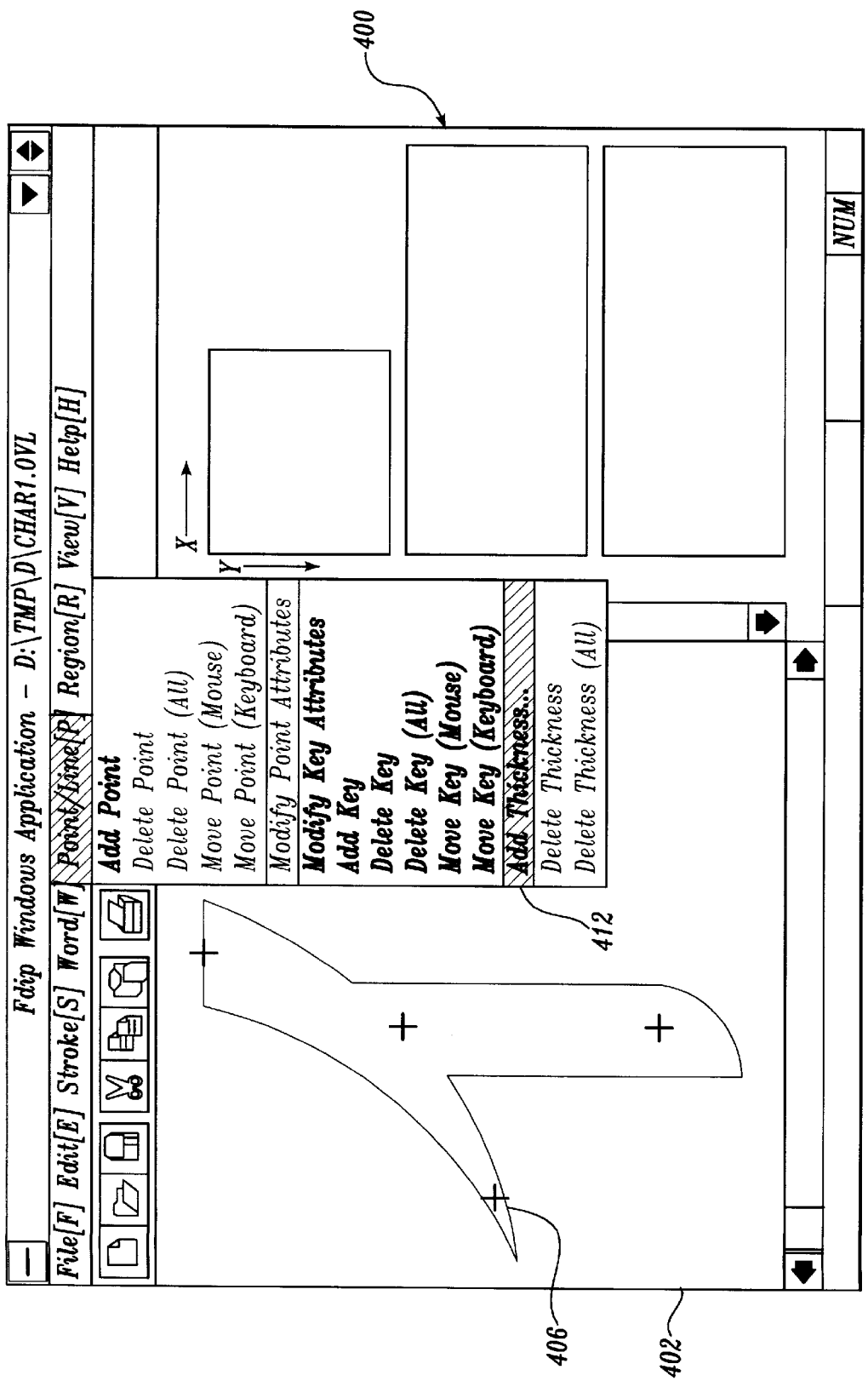
Figure 11C:
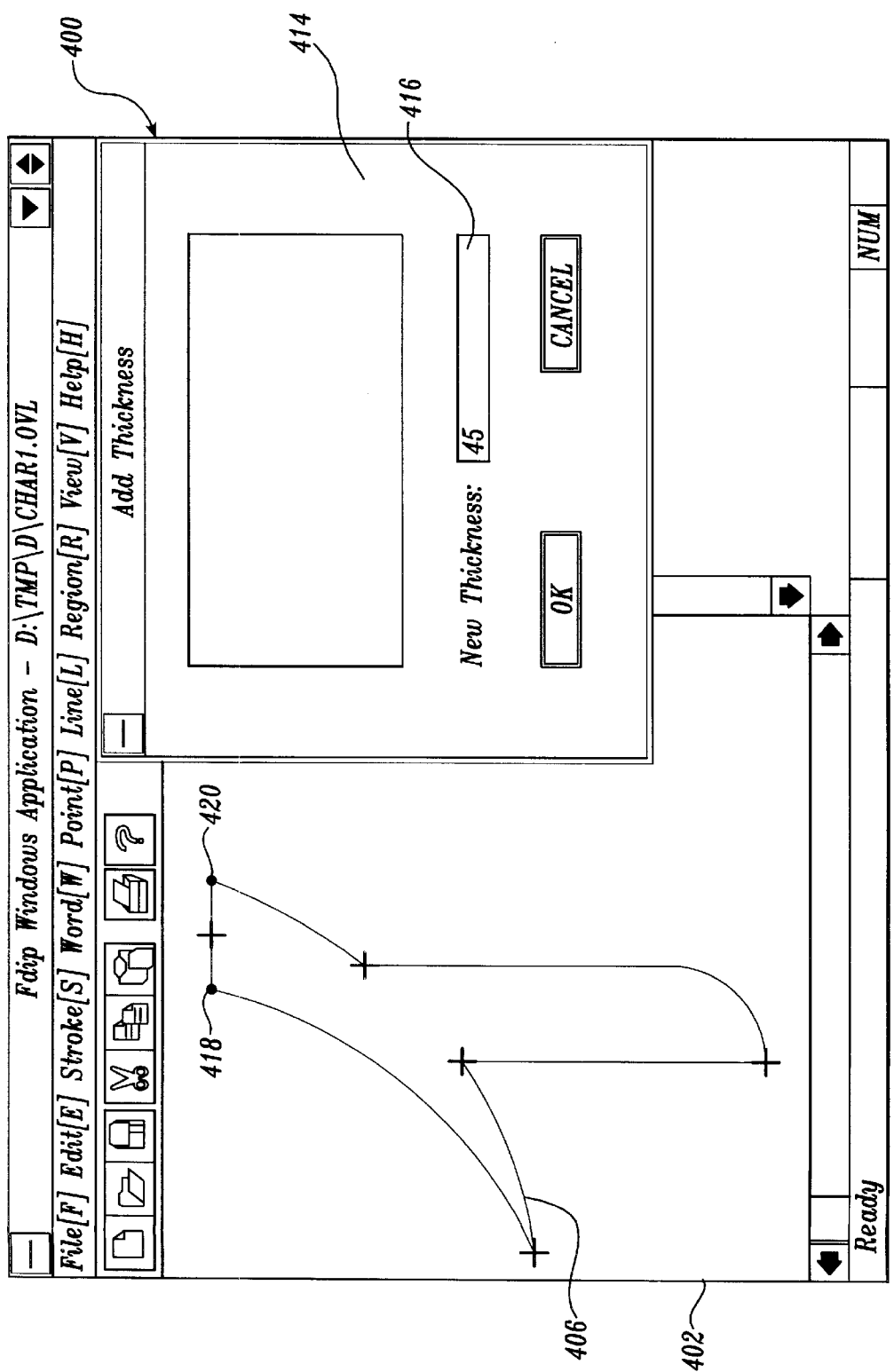

FIGS. 11A–11C illustrate the method of defining key points and width values on the CAD tool. In FIG. 11A, the font designer selects "Add Key" command 410 from the CAD tool menu, and places a cursor where the designer wishes to place a key point. By clicking a mouse, for example, the key point can be defined. The defined key points are identified by "+" marks.

To define a width value, in FIG. 11B, the font designer selects "Add Thickness" command 412 from the menu to retrieve an "Add Thickness" window 414, as shown in FIG. 11C. Then, in the display area 402, the font designer moves a cursor to designate first and second points 418, 420, between which the designer wishes to define a width value. The CAD tool 400 measures the straight-line distance between the first and second points 418, 420 and displays the distance as a thickness (width) value in a "New Thickness" box 416 within the "Add Thickness" window 414.

FIGS. 12A–12E illustrate how a font designer can define curve segments between feature points. As shown in FIG.

12A, the font designer begins the process by first retrieving a "Curve Level" window 420 and enters curve level "0" into a curve level code block 422. Then, in FIG. 12B, the font designer generates a curve segment between two feature points $P_A$ and $P_B$ with a single midcontrol point $P_1$. As shown, no curvature is created here, since midcontrol point $P_1$ is placed on the line connecting two consecutive feature points. Thus, the "curve segment" between the two feature points $P_A$ and $P_B$ at curve level "0" is a straight line including no curvature.

Figure 12A:
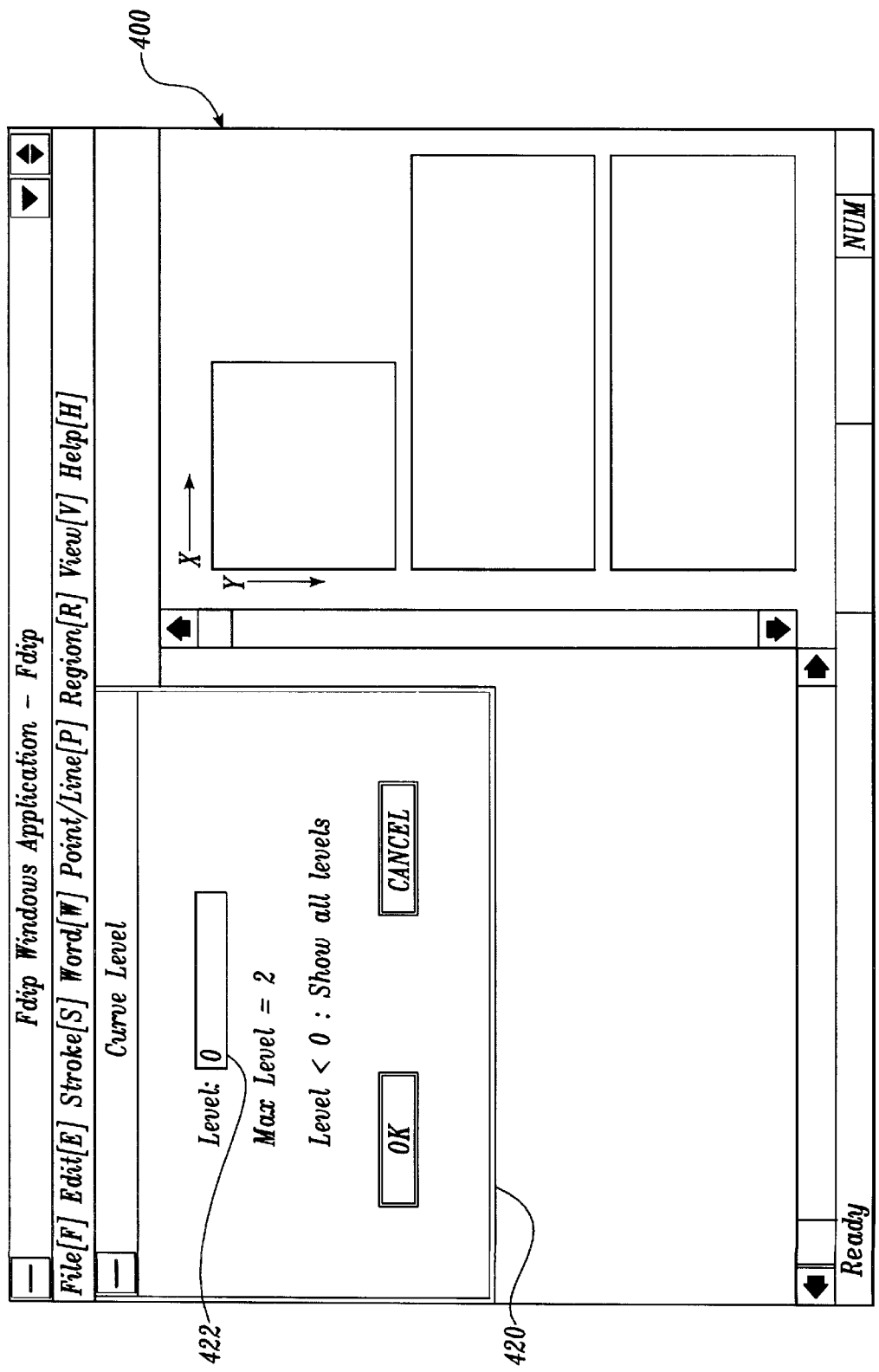
FIGS. 12A–12E are screen shots of a designer CAD tool used for defining curve ratios at various resolution levels.
Figure 12B:
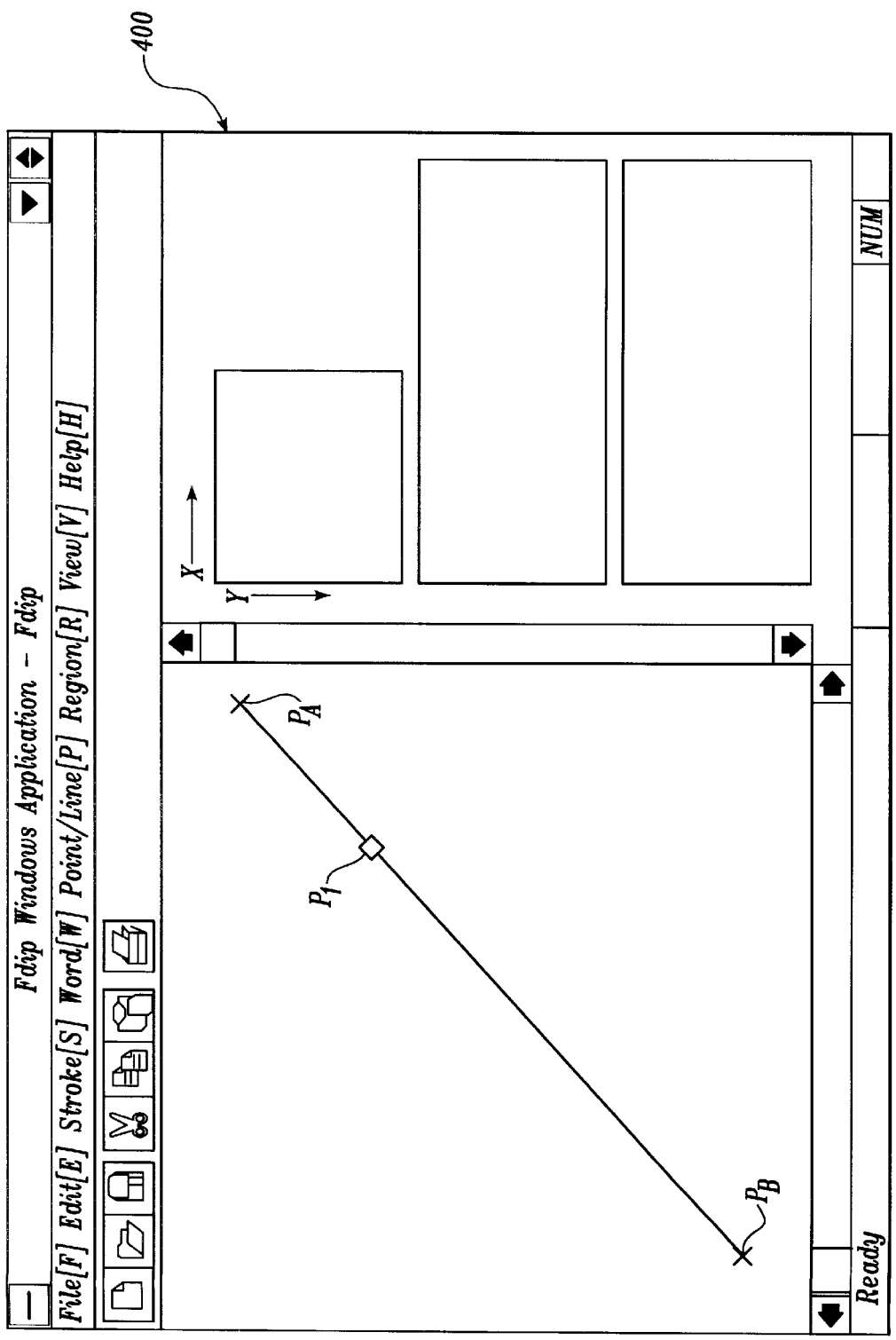
Figure 12C:
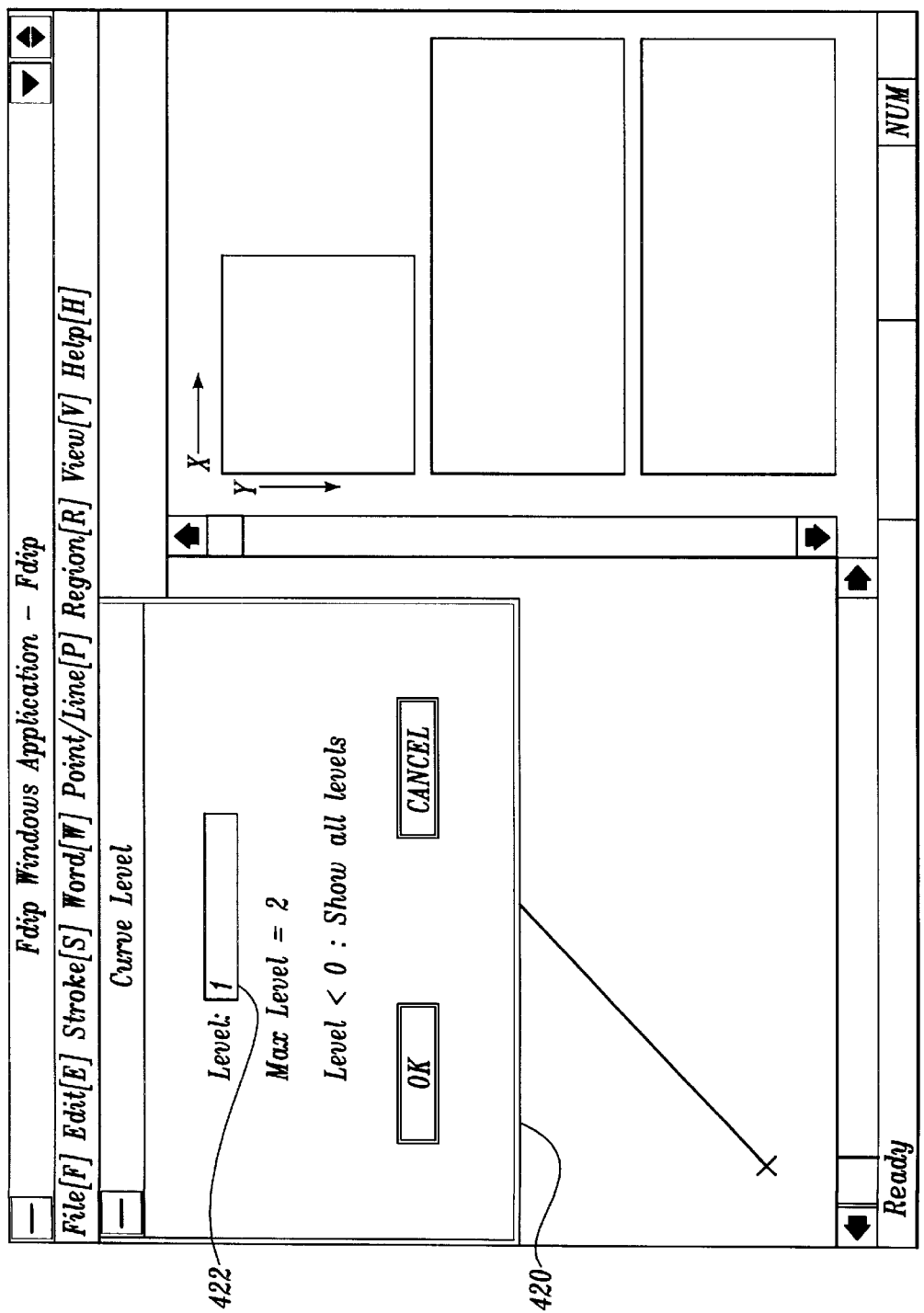
Figure 12D:
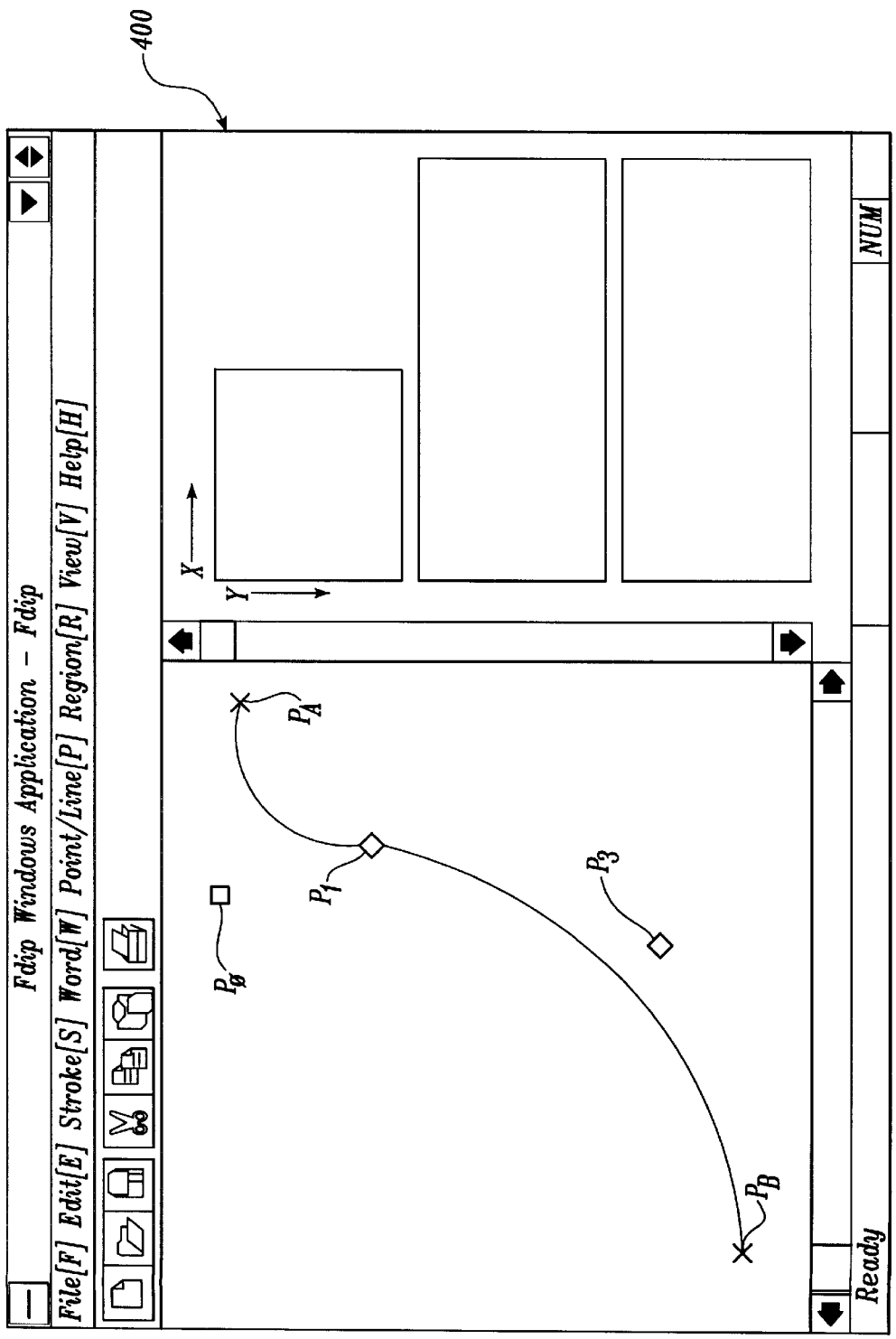

In FIG. 12C, the font designer defines curve level 1 within the curve level code block 422. Then, as shown in FIG. 12D, the initial curve segment is split into two curve segments between $P_A$ and $P_1$, and $P_1$ and $P_B$, and assigned two new midcontrol points, $P_0$ and $P_3$, respectively. These two curve segments, defined based on their curve ratios ($C(r)=L_2(x)/L_1(x)$, $L_2(y)/L_1(y)$, see FIG. 7A) are then stored at level "1".

Figure 12E:
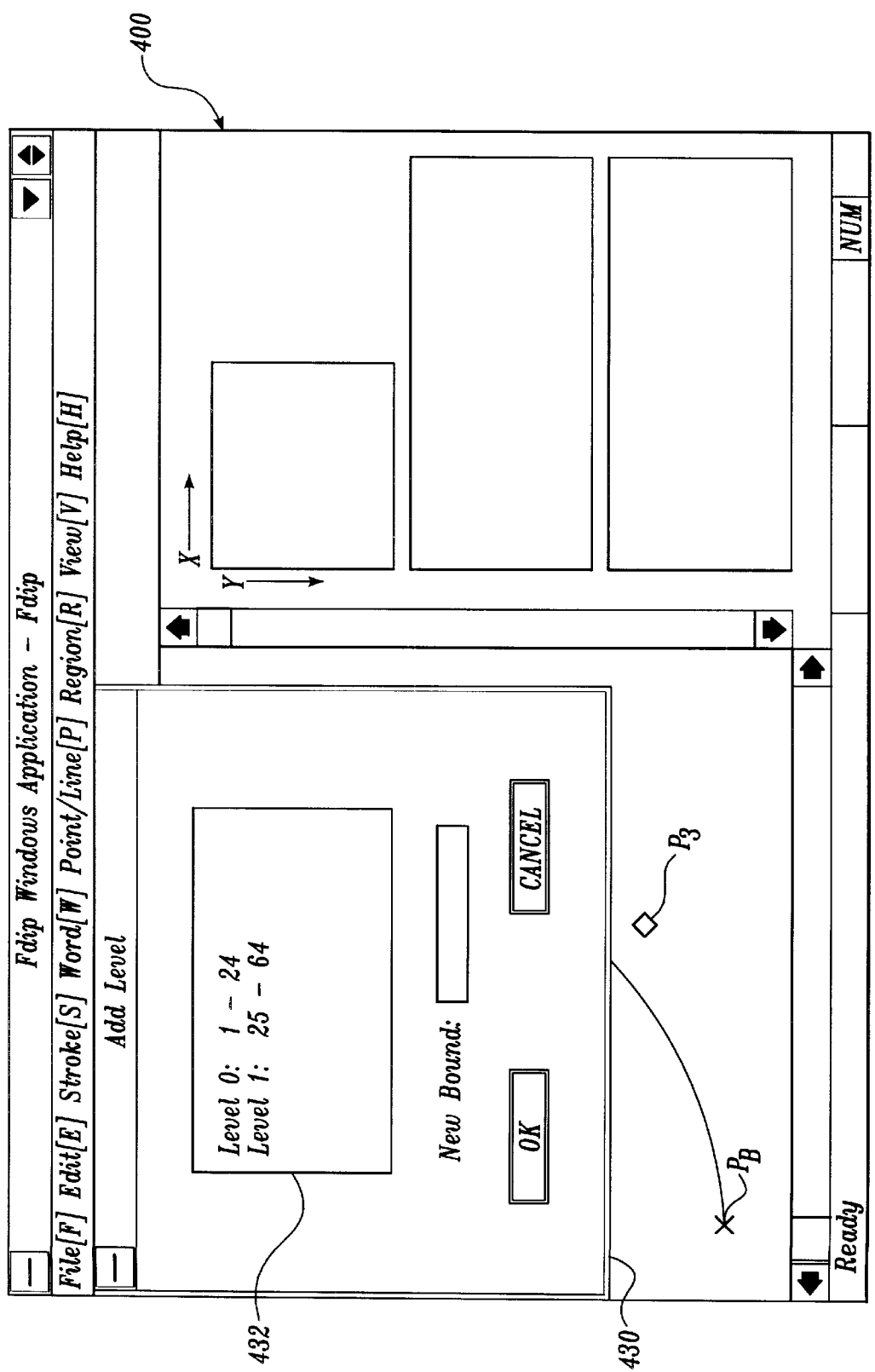

In FIG. 12E, the font designer completes curve level designation by assigning resolution boundary values to each curve level. The font designer retrieves "Add Level" window 430, which includes a resolution boundary display area 432. The display area 432 lists curve level numbers and the resolution boundaries that are assigned to respective curve level numbers. In FIG. 12E, for example, the font designer has assigned all bitmap resolution values up to and including 24×24 to Curve Level 0, and resolution values between 25×25 and 64×64 to Curve Level 1. Essentially, the font designer is assigning a resolution boundary to each curve level by visually determining the least amount of curve information required for generating acceptable curve segments at each range of resolution values. For example, if a curve segment displayed on a low-resolution display appears the same whether it is defined by a single midcontrol point or multiple midcontrol points, the font designer determines that it is wiser to define the curve segment with the single midcontrol point only, in order to save display processing time.

Figure 13A:
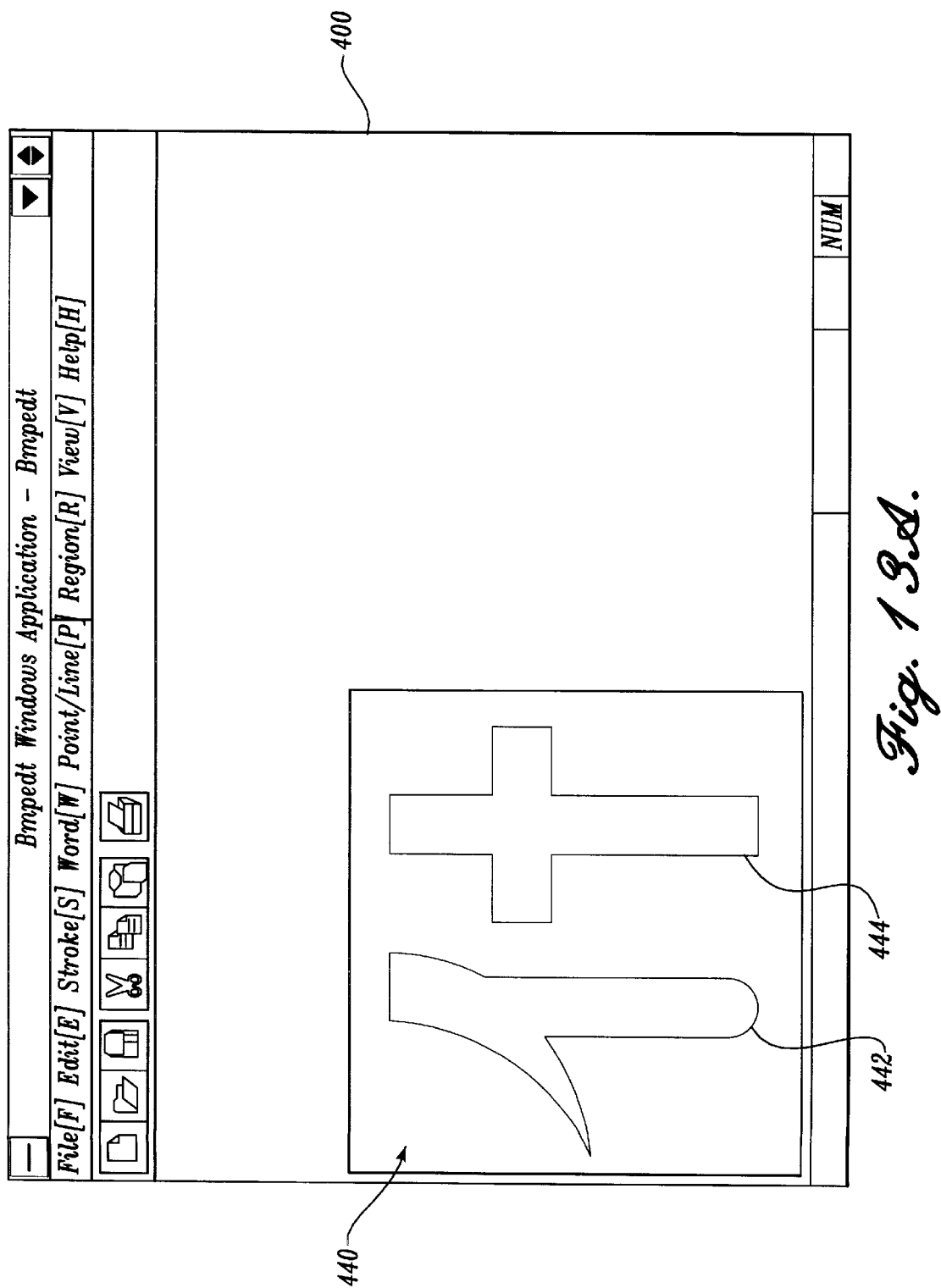
FIGS. 13A–13D are screen shots of a CAD tool used for fitting a basic glyph to another glyph to define another glyph.
Figure 13B:
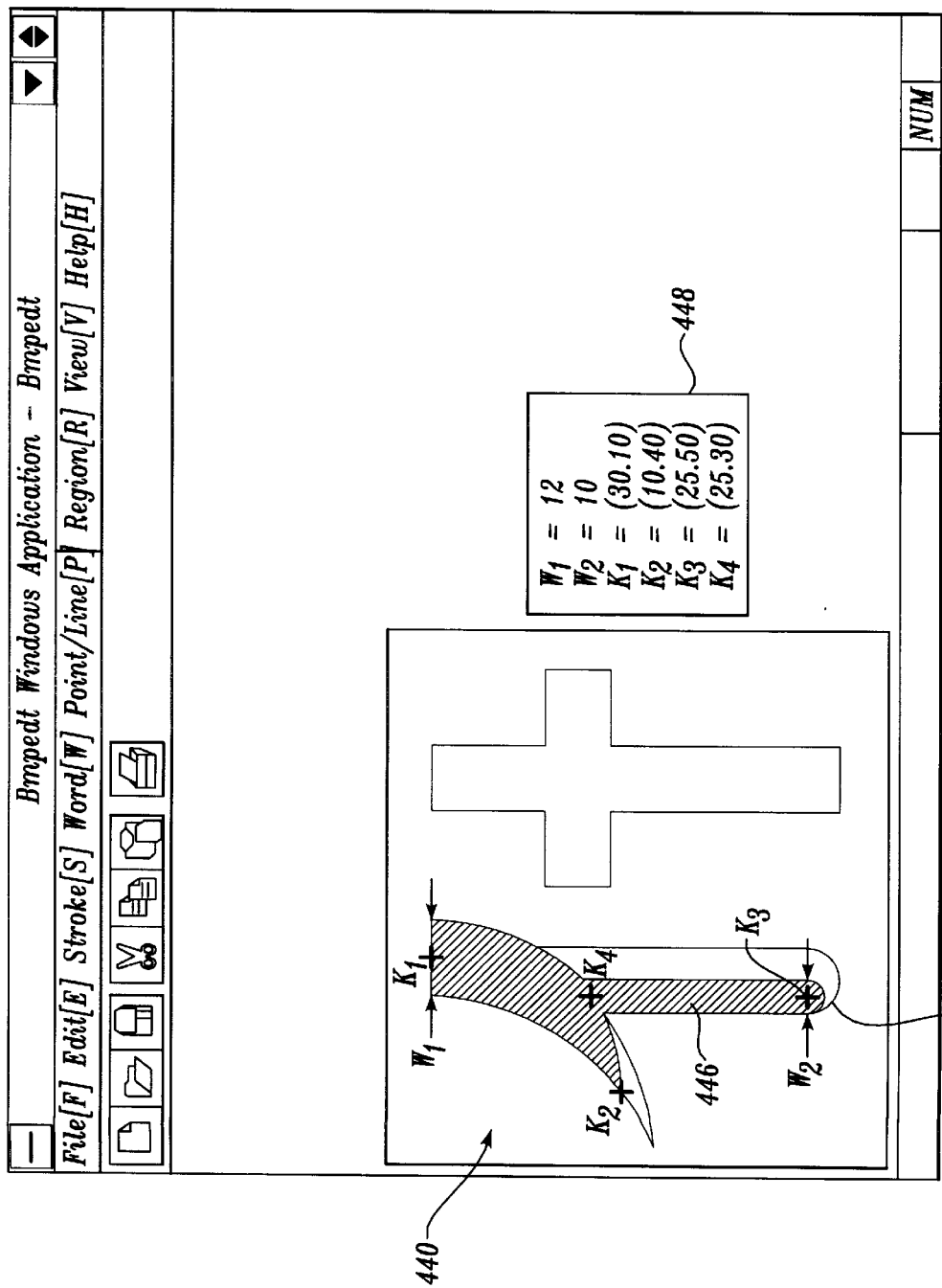
Figure 13C:
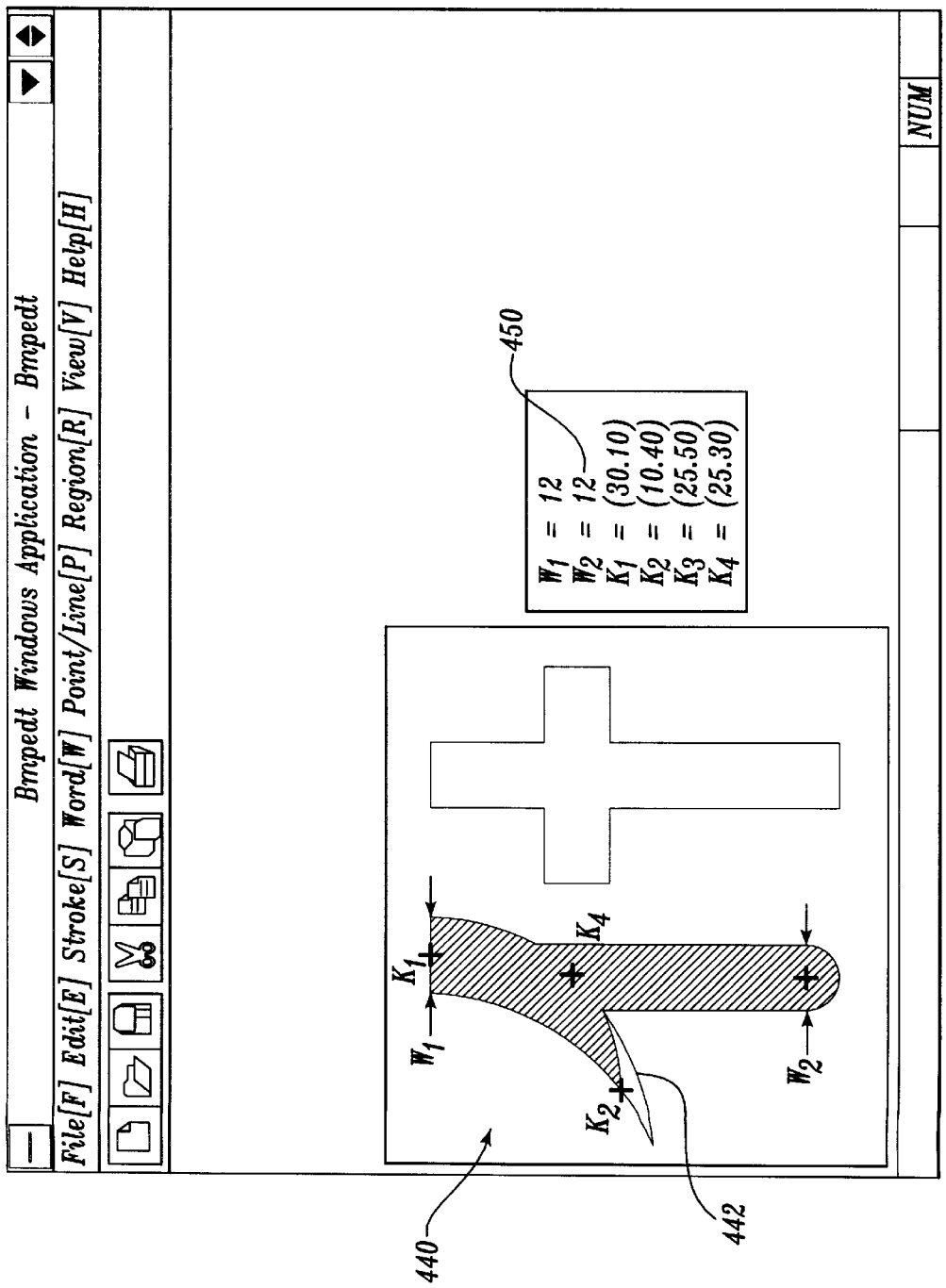
Figure 13D:
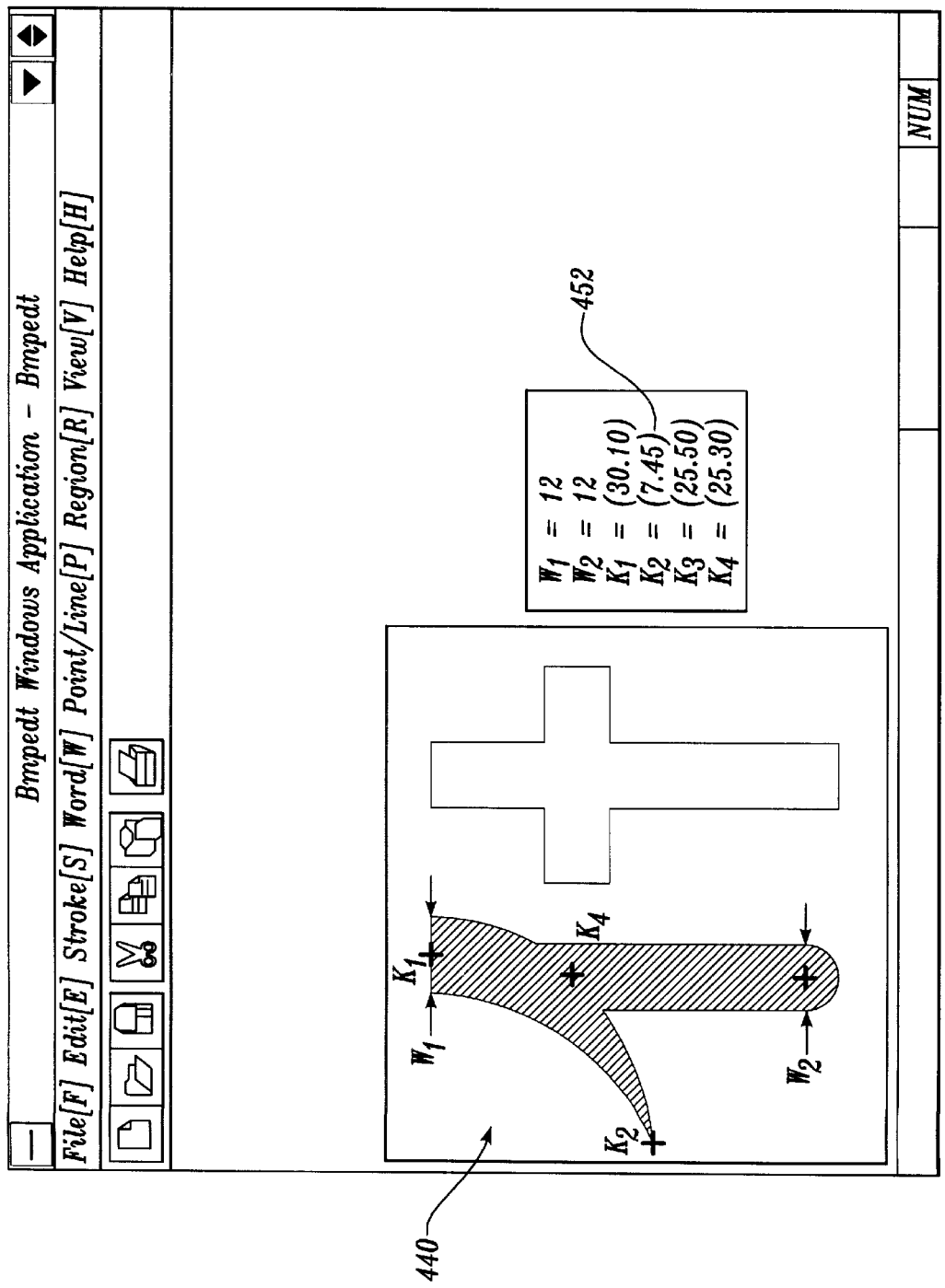

FIGS. 13A–13D are screen shots of the CAD tool 400, illustrating the method of fitting a basic glyph to another glyph to define the other glyph. First, in FIG. 13A, the user selects a character 440 of a font that the user desires to define using basic glyphs. The character 440 includes two glyphs 442, 444. First, the font designer selects the glyph 442, and attempts to define this glyph using a predefined basic glyph. In FIG. 13B, the font designer selects a basic glyph 446, which is most likely to match the outline shape of the selected glyph 442, and places the basic glyph 446 (crosshatched section) over the selected glyph 442. The basic glyph 446 is predefined, and includes four key points $K_1$–$K_4$ and two width values $W_1$ and $W_2$. The width values and X-Y coordinates of the key points are shown in a display area 448 of the CAD tool 400. It is noted that the outline of the basic glyph 446 does not quite match the outline shape of the selected glyph 442. To match the outline of the basic glyph 446 to that of the selected glyph 442, in FIG. 13C, the font designer first increases the width value $W_2$ from 10 to 12, as indicated by an arrow 450. Then, in FIG. 13D, the font designer moves the key point $K_2$ from its original position (10, 40) to a new position (7, 45), as indicated by reference number 452. Key point movement can be performed by a user-controlled cursor or by directly entering new coordinate locations for the key points. Width value change can be performed by entering new width values.

As described above, the present invention provides a method for generating a glyph-based outline font, which has relatively low memory requirement and is well suited for font communication between various devices having different resolutions. Because the method defines and generates curve segments that define the outline of each glyph according to the resolution level of a particular output device used, the method can produce high-quality display in both high- and low-resolution devices.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A character generating method for generating character images for display on an output device having a predefined level of resolution, wherein each generated character is defined by a set of glyphs, the method comprising:
    a) selecting a character for display on the output device, wherein each glyph forming the character is predefined by key points, width values, feature points that have predefined spatial relationship to the key points and width values, and curve ratios prestored in a curve level table;
    b) determining the resolution of the output device;
    c) for each glyph forming the character, retrieving curve ratios from the prestored curve level table according to the determined resolution of the output device; and
    d) rendering the glyphs of the selected character on the output device according to the key points, the width values, the feature points, and the retrieved curve ratios.

2. The character generating method of claim 1, wherein step d further comprises the steps of:
    i) for each glyph forming the character, calculating the feature points according to the predefined spatial relationship with the key points and width values;
    ii) for each glyph forming the character, calculating at least one curve segment between consecutive calculated feature points according to at least one retrieved curve ratio; and
    iii) obtaining outlines for the glyphs by connecting the generated curve segments.

3. The character generating method of claim 2, wherein step d ii further comprises the steps of:
    calculating at least one midcontrol point existing between two consecutive calculated feature points according to the at least one curve ratio; and
    calculating the at least one curve segment using a Bezier triangle curve generation method according to the at least one midcontrol point and the corresponding feature points.

4. The character generating method of claim 1, wherein rendering the glyphs in step d further comprises filling within the glyphs' outlines.

5. The character generating method of claim 4, wherein the glyph is predivided into one or more single run-length regions and the filling of the glyph outline comprises filling each of the single run-length regions separately.

6. The character generating method of claim 1, wherein a key point is labeled with hint information if the key point requires a predetermined specific display location with respect to a bitmap cell upon which the key point falls, and step d of the method further comprising:
    i) for each glyph forming the character, calculating labeled key point positions at predetermined positions relative to the bitmap cell upon which the key point falls;
    ii) for each glyph forming the character, calculating nonlabeled key point positions at the key points' prestored positions; and iii) rendering the glyphs of the selected character on the output device according to the calculated labeled and nonlabeled key points, the width values, the feature points, and the retrieved curve ratios.

7. A character generating apparatus for generating character images for display on an output device having a predefined level of resolution, wherein each generated character is defined by a set of glyphs, the apparatus comprising:

means for selecting a character for display on the output device, wherein each glyph forming the character is predefined by key points, width values, feature points that have predefined spatial relationship to the key points and width values, and curve ratios prestored in a curve level table;

means for determining the resolution of the output device;

means for retrieving curve ratios from the prestored curve level table according to the determined resolution of the output device for each of the glyphs forming the character; and means for rendering the glyphs of the selected character on the output device according to the key points, the width values, the feature points, and the retrieved curve ratios.

8. The character generating apparatus of claim 7, wherein the means for rendering the glyphs further comprises:

means for calculating the feature points according to the predefined spatial relationship with the key points and width values;

means for calculating at least one curve segment between consecutive calculated feature points according to at least one retrieved curve ratio; and means for obtaining outlines for the glyphs by connecting the generated curve segments.

9. The character generating apparatus of claim 8, wherein the means for calculating at least one curve segment further comprises:

means for calculating at least one midcontrol point existing between two consecutive calculated feature points according to the at least one curve ratio; and means for calculating the at least one curve segment using a Bezier triangle curve generation method according to the at least one midcontrol point and the corresponding feature points.

10. The character generating apparatus of claim 7, wherein the means for rendering the glyphs further comprises means for filling within the glyphs' outlines.

11. The character generating apparatus of claim 10, wherein the glyph is predivided into one or more single run-length regions and the means for filling within the glyph's outline fills each of the single run-length regions separately.

12. The character generating apparatus of claim 7, wherein a key point is labeled with hint information if the key point requires a predetermined specific display location with respect to a bitmap cell upon which the key point falls, and the means for rendering the glyphs further comprises:

means for calculating labeled key point positions at predetermined positions relative to the bitmap cell upon which the key point falls;

means for calculating nonlabeled key point positions at the key points' prestored positions; and means for rendering the glyphs of the selected character on the output device according to the calculated labeled and nonlabeled key points, the width values, the feature points, and the retrieved curve ratios.

13. A computer-readable medium having computer-executable instructions for generating character images for display on an output device having a predefined level of resolution, wherein each generated character is defined by a set of glyphs, the instructions when loaded into a computer causing the computer to execute the steps of:

a) selecting a character for display on the output device, wherein each glyph forming the character is predefined by key points, width values, feature points that have predefined spatial relationship to the key points and width values, and curve ratios prestored in a curve level table;

b) determining the resolution of the output device;

c) for each glyph forming the character, retrieving curve ratios from the prestored curve level table according to the determined resolution of the output device; and d) rendering the glyphs of the selected character on the output device according to the key points, the width values, the feature points, and the retrieved curve ratios.

14. The medium of claim 13, wherein step d further comprises the steps of:

i) for each glyph forming the character, calculating the feature points according to the predefined spatial relationship with the key points and width values;

ii) for each glyph forming the character, calculating at least one curve segment between consecutive calculated feature points according to at least one retrieved curve ratio; and iii) obtaining outlines for the glyphs by connecting the generated curve segments.

15. The medium of claim 14, wherein step d ii further comprises the steps of:

calculating at least one midcontrol point existing between two consecutive calculated feature points according to the at least one curve ratio; and calculating the at least one curve segment using a Bezier triangle curve generation method according to the at least one midcontrol point and the corresponding feature points.

16. The medium of claim 13, wherein rendering the glyphs in step d further comprises filling within the glyphs' outlines.

17. The medium of claim 16, wherein the glyph is predivided into one or more single run-length regions and the filling of the glyph outline comprises filling each of the single run-length regions separately.

18. The medium of claim 13, wherein a key point is labeled with hint information if the key point requires a predetermined specific display location with respect to a bitmap cell upon which the key point falls, and step d of the instructions further comprises:

i) for each glyph forming the character, calculating labeled key point positions at predetermined positions relative to the bitmap cell upon which the key point falls;

ii) for each glyph forming the character, calculating nonlabeled key point positions at the key points' prestored positions; and iii) rendering the glyphs of the selected character on the output device according to the calculated labeled and nonlabeled key points, the width values, the feature points, and the retrieved curve ratios.

19. A method of defining a set of basic glyphs for defining glyphs and characters based thereon, wherein the character images are adapted for display on an output device having a predefined level of resolution, the method comprising:

a) retrieving a set of characters that include similarly shaped glyphs;

b) selecting one basic glyph that best represents the similarly shaped glyphs topographically;

c) defining feature points along the outline of the basic glyph;

d) defining key points;

e) defining width values;

f) defining equations that obtain the feature points based on the key points and the width values;

g) defining curve ratios and storing them in a curve level table for creating curve segments between adjacent feature points; and h) repeating steps a–g until all glyphs in the set of characters are represented by at least one basic glyph.

20. The method of claim 19, further comprising:

i) dividing the basic glyph into one or more single run-length regions; and j) defining each single run-length region with its left and right curve segments.

21. The method of claim 19, wherein step c further comprises:

i) fitting the glyph within a minimum square;

ii) identifying feature points at the leftmost, lowermost, rightmost, and uppermost edges of the minimum square;

iii) if all curve segments between two consecutive feature points are not on the same side of the line connecting the two feature points, identifying feature points at inflection points;

iv) identifying any acute-angle points as feature points; and v) forming a minimum square for each pair of two adjacent feature points, and if any curve segment between the two feature points lies outside the minimum square, expanding the minimum square until it fits all curve segments between the two feature points and identifying feature points at the leftmost, lowermost, rightmost, and uppermost edges of the minimum square.

22. A computer graphical user interface tool for defining a set of basic glyphs for defining glyphs and characters based thereon, wherein the character images are adapted for display on an output device having a predefined level of resolution, the user interface tool including an output device, processor, and memory, the tool comprising:

means for retrieving a set of characters that include similarly shaped glyphs;

means for selecting one basic glyph that best represents the similarly shaped glyphs topographically;

means for defining feature points along the outline of the basic glyph;

means for defining key points;

means for defining width values;

means for defining equations that obtain the feature points based on the key points and the width values; and means for defining curve ratios and storing them in a curve level table for creating curve segments between adjacent feature points.

23. The tool of claim 22, further comprising:

means for dividing the basic glyph into one or more single run-length regions; and means for defining each single run-length region with its left and right curve segments.

24. The tool of claim 22, wherein the means for defining feature points further comprises:

means for fitting the glyph within a minimum square;

means for identifying feature points at the leftmost, lowermost, rightmost, and uppermost edges of the minimum square;

means for identifying feature points at inflection points if all curve segments between two consecutive feature points are not on the same side of the line connecting the two feature point;

means for identifying any acute-angle points as feature points; and means for forming a minimum square for each pair of two adjacent feature points, and if any curve segment between the two feature points lies outside the minimum square, expanding the minimum square until it fits all curve segments between the two feature points and identifying feature points at the leftmost, lowermost, rightmost, and uppermost edges of the minimum square.

25. A method of defining a set of characters using a set of predefined basic glyphs, the basic glyphs being predefined by key points, width values, feature points that have predefined spatial relationship to the key points and width values, and curve ratios prestored in a curve level table, and wherein the character images are adapted for display on an output device having a predefined level of resolution, the method comprising:

a) retrieving a set of characters to be defined;

b) selecting one character;

c) selecting one glyph of the character;

d) retrieving a predefined basic glyph that most closely matches the selected glyph topographically;

e) fitting an outline shape of the retrieved basic glyph to an outline shape of the selected glyph by changing the key points and width values of the basic glyph;

f) storing the selected glyph with its key points and width values;

g) repeating steps c–f until all glyphs in the selected character are defined; and h) repeating steps b–f until the entire set of characters is defined.

26. The method of claim 25, further comprising:

identifying a key point that requires a predetermined specific display location with respect to a bitmap cell upon which the key point falls; and labeling the identified key point with hint information.

27. A computer graphical user interface tool for defining a set of characters using a set of predefined basic glyphs, the basic glyphs being predefined by key points, width values, feature points that have predefined spatial relationship to the key points and width values, and curve ratios prestored in a curve level table, wherein the character images are adapted for display on an output device having a predefined level of resolution, the tool including an output device, processor, and memory, the tool comprising:

means for retrieving a set of characters to be defined;

means for selecting one character;

means for selecting one glyph of the character;

means for retrieving a predefined basic glyph that most closely matches the selected glyph topographically;

means for fitting an outline shape of the retrieved basic glyph to an outline shape of the selected glyph by changing the key points and width values of the basic glyph; and means for storing the selected glyph with its key points and width values.

28. The tool of claim 27, further comprising:

means for identifying a key point that requires a predetermined specific display location with respect to a bitmap cell upon which the key point falls; and means for labeling the identified key point with hint information.

* * * * *